(12) United States Patent
Worrell et al.

(10) Patent No.: US 6,588,821 B2
(45) Date of Patent: Jul. 8, 2003

(54) MULTIPURPOSE CONSOLE

(75) Inventors: Barry C. Worrell, Dayton, OH (US); Shawn T. Nichols, Dayton, OH (US); Sherry N. Phillips, Clinton Twp., MI (US); Anton S. Wojcik, Rochester Hills, MI (US); Nicole M. Mahmood, New Carlisle, OH (US); Frank X. Kreiling, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/973,211

(22) Filed: Oct. 9, 2001

(65) Prior Publication Data

US 2002/0140246 A1 Oct. 3, 2002

Related U.S. Application Data

(60) Provisional application No. 60/281,092, filed on Apr. 3, 2001.

(51) Int. Cl.[7] ................................................. B60R 7/00
(52) U.S. Cl. .................. 296/37.8; 296/37.14; 296/24.1; 224/275; 224/400; 224/926; 224/929
(58) Field of Search ............................... 296/37.1, 37.8, 296/37.14, 64, 65.03, 24.1; 297/256.16, 250.1, 188.4; 224/275, 400, 484, 926, 929; 248/503

(56) References Cited

U.S. PATENT DOCUMENTS

| 2,584,435 | A | | 2/1952 | Doerr ........................... 257/10 |
|---|---|---|---|---|
| 3,193,326 | A | * | 7/1965 | Smith ...................... 174/153 G |
| 3,721,434 | A | | 3/1973 | Spies .......................... 269/328 |
| 3,732,955 | A | | 5/1973 | Carter et al. .................... 190/51 |
| 3,808,401 | A | * | 4/1974 | Wright et al. ................. 165/58 |
| 3,949,902 | A | | 4/1976 | Thompson ............... 222/129.1 |
| 4,106,829 | A | | 8/1978 | Dolle et al. .................. 312/235 |
| 4,733,901 | A | | 3/1988 | Okuyama ................... 296/37.8 |
| 4,756,573 | A | * | 7/1988 | Simin et al. ................. 297/117 |
| 4,796,791 | A | | 1/1989 | Goss et al. ................... 224/275 |
| 4,832,241 | A | * | 5/1989 | Radcliffe ....................... 108/44 |
| 4,846,257 | A | | 7/1989 | Wallace et al. ................ 165/39 |
| 4,867,498 | A | * | 9/1989 | Delphia et al. .............. 224/311 |
| 5,067,417 | A | | 11/1991 | Marmentini et al. .......... 108/36 |
| 5,106,143 | A | | 4/1992 | Soeters ....................... 296/37.8 |
| 5,244,278 | A | | 9/1993 | Robitaille ....................... 383/4 |

(List continued on next page.)

Primary Examiner—D. Glenn Dayoan
Assistant Examiner—Lori L Coletta
(74) Attorney, Agent, or Firm—Kathryn A. Marra

(57) ABSTRACT

A multipurpose console for use in a vehicle having a support structure having an internal compartment, a latching mechanism being fixedly secured to a lower surface of the support structure and providing a method for releasably engaging a mounting member of the vehicle. The internal compartment has a lid pivotally secured to an upper portion of the support structure and moves between a first position and a second position. The lid covers the internal compartment when the lid is in the first position and the lid has an upper portion and a lower portion. The upper portion is pivotally secured to the lower portion for movement between the first position and the second position. The upper portion and the lower portion define a surface area for changing a child's diaper when the upper portion is in the second position. The internal compartment provides a plurality of storage areas for products necessary to facilitate the changing of the child's diaper. The multipurpose console also includes an electronic entertainment device.

30 Claims, 21 Drawing Sheets

U.S. PATENT DOCUMENTS

| | | | | |
|---|---|---|---|---|
| 5,338,081 A | * | 8/1994 | Young et al. | 224/542 |
| 5,358,307 A | * | 10/1994 | Shafer et al. | 224/275 |
| 5,397,160 A | | 3/1995 | Landry | 296/37.8 |
| 5,439,253 A | * | 8/1995 | Trubiano | 280/33.993 |
| 5,487,588 A | * | 1/1996 | Burleigh et al. | 297/253 |
| 5,492,068 A | | 2/1996 | McKee | 108/44 |
| 5,615,433 A | * | 4/1997 | Martin | 5/423 |
| D394,581 S | | 5/1998 | Paris | D7/326 |
| 5,775,771 A | | 7/1998 | La Cour et al. | 297/238 |
| 5,813,200 A | | 9/1998 | Jacoby et al. | 53/567 |
| 5,823,599 A | | 10/1998 | Gray | 296/37.8 |
| 5,852,838 A | | 12/1998 | Johnson | 5/655 |
| 5,911,471 A | | 6/1999 | Benedict et al. | 297/158.1 |
| 5,926,909 A | * | 7/1999 | McGee | 15/339 |
| 5,968,396 A | * | 10/1999 | Rodriguez | 219/437 |
| 6,032,840 A | | 3/2000 | Gregory | 224/275 |
| 6,055,688 A | * | 5/2000 | Helmsderfer et al. | 5/136 |
| 6,116,674 A | * | 9/2000 | Allison et al. | 296/37.8 |
| 6,128,890 A | | 10/2000 | Firth | 53/567 |
| 6,135,529 A | * | 10/2000 | De Angelis et al. | 224/281 |
| 6,254,160 B1 | * | 7/2001 | Marriott et al. | 126/38 |
| 6,264,261 B1 | * | 7/2001 | Krafcik | 296/37.8 |
| 6,330,337 B1 | * | 12/2001 | Nicholson et al. | 381/302 |

* cited by examiner

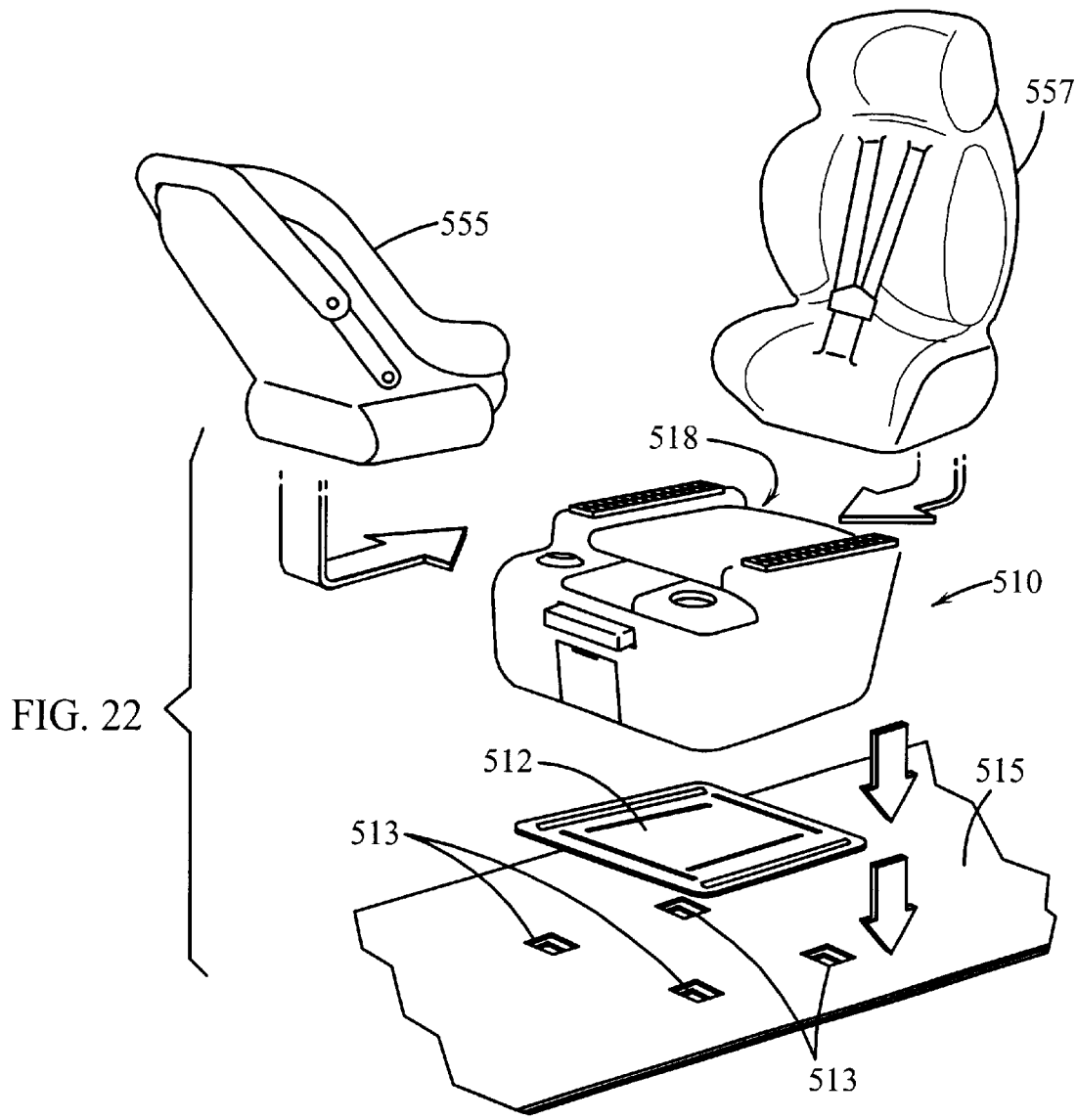

MULTIPURPOSE CONSOLE

CROSS REFERENCE TO RELATED APPLICATIONS

This application claims the benefit of U.S. Provisional Patent Application No. 60/281,092 filed on Apr. 3, 2001, the contents of which are incorporated herein by reference thereto.

This application is related to U.S. patent application Ser. No. 09/723,734 filed on on Nov. 28, 2000 the contents of which are incorporated herein by reference thereto.

TECHNICAL FIELD

The present invention is related generally to a multipurpose console and more particularly, a multipurpose console for vehicle applications.

BACKGROUND OF THE INVENTION

Some vehicles, particularly larger sized vehicles, have removable bucket seats for altering the seating arrangements and storage areas of the vehicle in accordance with the user's preference.

These removable seats each have a latching mechanism for securing and engaging a latching mechanism such as a mounting member fixedly secured to the vehicle floor or frame. The latching mechanisms each have an associated spring-loaded latching mechanism for anchoring the seats in place.

The vehicle seats can be easily removed by depressing a latching lever and lifting the seats from the mounting brackets in the floorboard of the vehicle. In some applications, several such seats are mounted to the vehicle, particularly in the second and third rows of seats.

In order to provide the vehicle occupants with amenities, vehicle consoles for storage of articles and the like are permanently mounted between the seats of the vehicle or, in some cases, are included in fixed armrests.

Consoles may include accessories such as cupholders and storage bins, although existent consoles provide the vehicle occupants with minimal storage and usefulness, due in part to the restricted space between vehicle seats.

SUMMARY OF THE INVENTION

A removable floor-mounted multipurpose console that utilizes the relatively large space created when a removable seat has been removed from a vehicle. The console can be removably attached in the location where a seat has been removed. The removable floor-mounted console of the present invention includes a frame having a base with a seat mounting mechanism attached thereto for removably mounting the base and frame to the vehicle in an area where a seat has been removed. Typically, the seat mounting structure is a four point connection to the vehicle floor and provides a relatively wide base from which to provide a frame for including a variety of console accessories.

In an exemplary embodiment of the invention, the multipurpose console includes a support structure having an internal compartment and a latching mechanism being fixedly secured to a lower surface of the support structure. The latching mechanism provides a means for releasably engaging a mounting member of the vehicle. The internal compartment has a lid pivotally secured to an upper portion of the support structure and moves between a first position and a second position. The lid covers the internal compartment when the lid is in the first position, and the lid has an upper portion and a lower portion. The upper portion is pivotally secured to the lower portion for movement between the first and the second position. The upper portion and the lower portion define a surface area for changing a child's diaper when the upper portion is in the second position. The internal compartment provides a plurality of storage areas for products necessary to facilitate the changing of the child's diaper. The multipurpose console also includes an electronic entertainment device.

In another embodiment, the multipurpose console is configured for receipt of a child safety seat which may be secured to the multipurpose console in either a forward or rearward facing position.

The above-described and other features and advantages of the present invention will be appreciated and understood by those skilled in the art from the following detailed description, drawings, and appended claims.

BRIEF DESCRIPTION OF THE DRAWINGS

FIG. 22 is an exploded view of another alternative embodiment;

DETAILED DESCRIPTION OF THE PREFERRED EMBODIMENT

Referring now to FIGS. 1–5, a multipurpose console 10, constructed in accordance with an exemplary embodiment of the present invention is illustrated. Console 10 is a childcare console providing features for assisting and attending to the care of an infant.

Console 10 is constructed out of a durable, lightweight, easily-molded material such as plastic and generally has a rectangular configuration. In an exemplary embodiment, console 10 has an overall length of approximately 857.5 mm, a width of approximately 480.00 mm, and a height of approximately 331.00 mm. Of course, console 10 can be constructed out of other materials and in a variety of sizes and configurations.

Console 10 has a latching mechanism 12 disposed at a bottom 14 of console 10. Latching mechanism 12 provides a means for securing and releasing console 10 from a securement feature of a vehicle. For example, latching mechanism 12 is similar to those employed on removable vehicle seats, in particular the mechanisms employed by seats used in vans having a plurality of seats with an easily accessible quick release mechanism. Of course, and as applications may require, alternative latching mechanisms providing a quick release securement to an existing mounting member for a vehicle seat may be employed.

Figure 10:
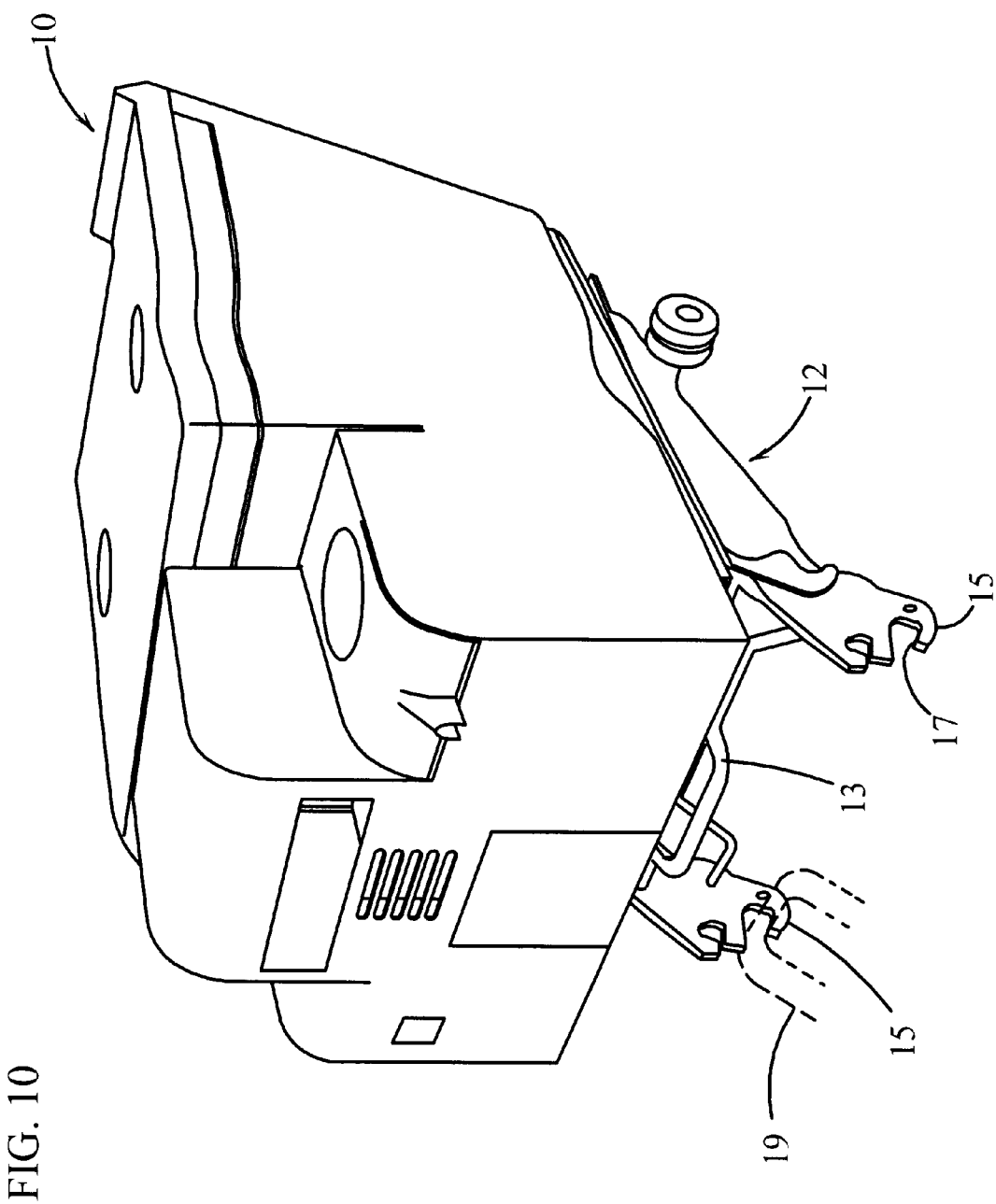
FIG. 10 is a perspective view of a multipurpose console constructed in accordance with an exemplary embodiment of the present invention.
Figure 11:
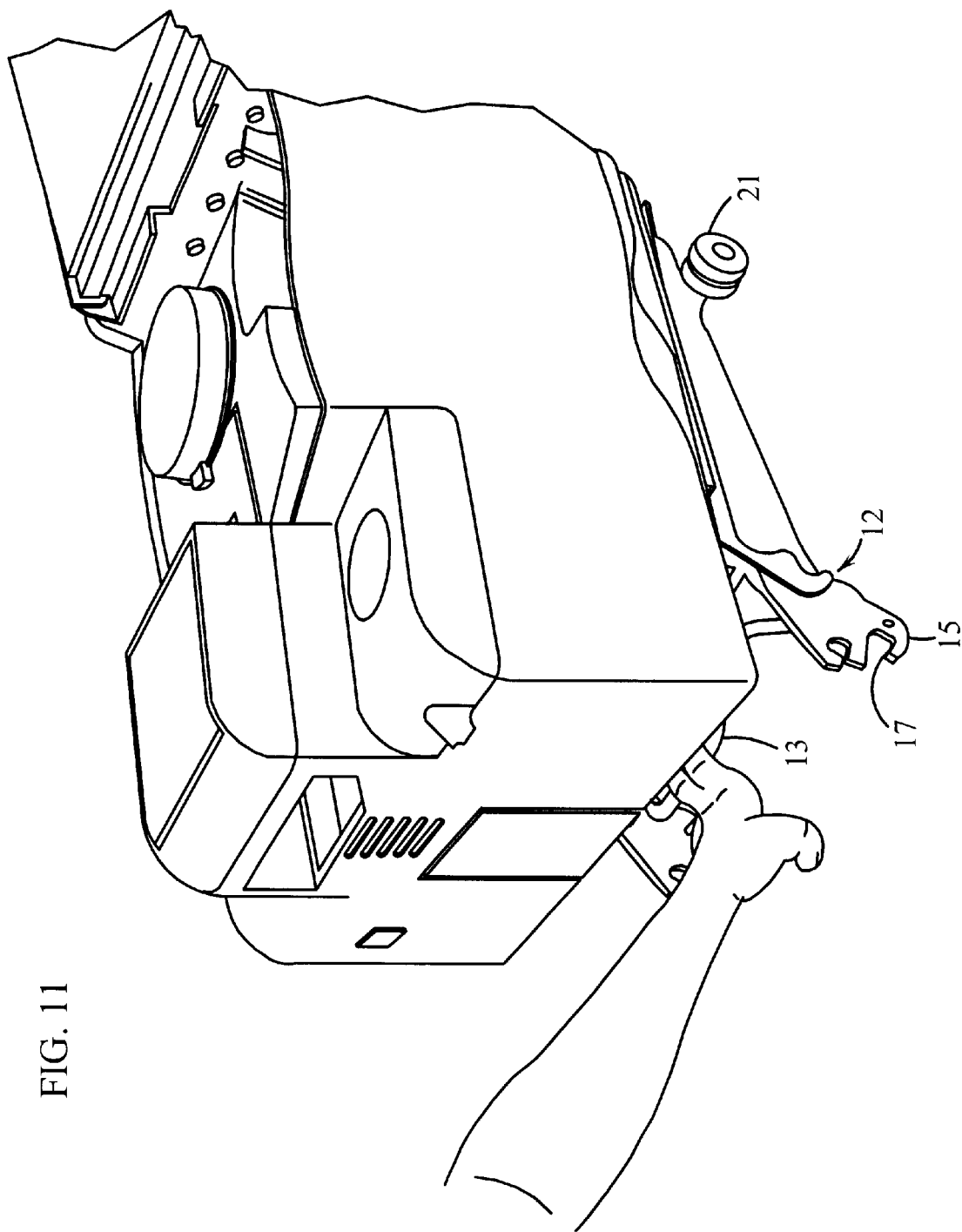
FIG. 11 is a perspective view illustrating the operation of the locking mechanism of the multipurpose console.

Latching mechanism 12 includes a spring biased release mechanism 13 which allows a user to disengage and engage console 10 from a securement member of a vehicle. For example, and referring now to FIGS. 10–12, latching mechanism 12 has a pair of latching members 15. Latching members 15 are configured to have a receiving area 17. Receiving area 17 receives a portion of a securement member 19 (illustrated by the dashed lines in FIG. 10). In an exemplary embodiment, securement member 19 is an engagement member used for securing the removable seats of a vehicle.

Figure 12:
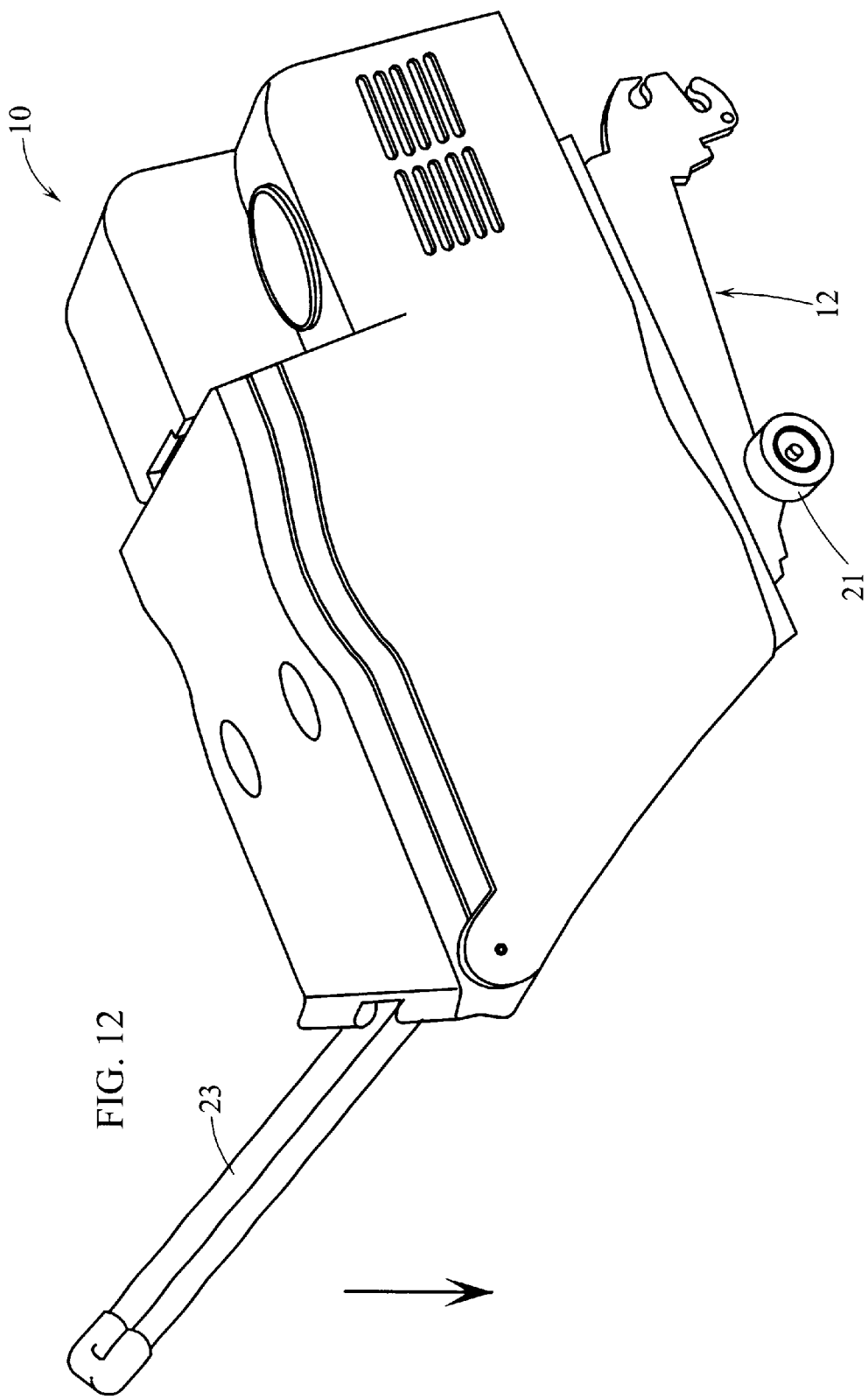
FIG. 12 is a perspective view of a multipurpose console constructed in accordance with an exemplary embodiment of the present invention.

In addition, and as an alternative latching mechanism 12 is equipped with a pair of wheels 21 and console 10 is provided with a telescoping handle 23. Accordingly, and as illustrated in FIG. 12, console 10 becomes a movable item has a downward force in the direction of arrow 25 is applied to handle 23.

Figure 1:
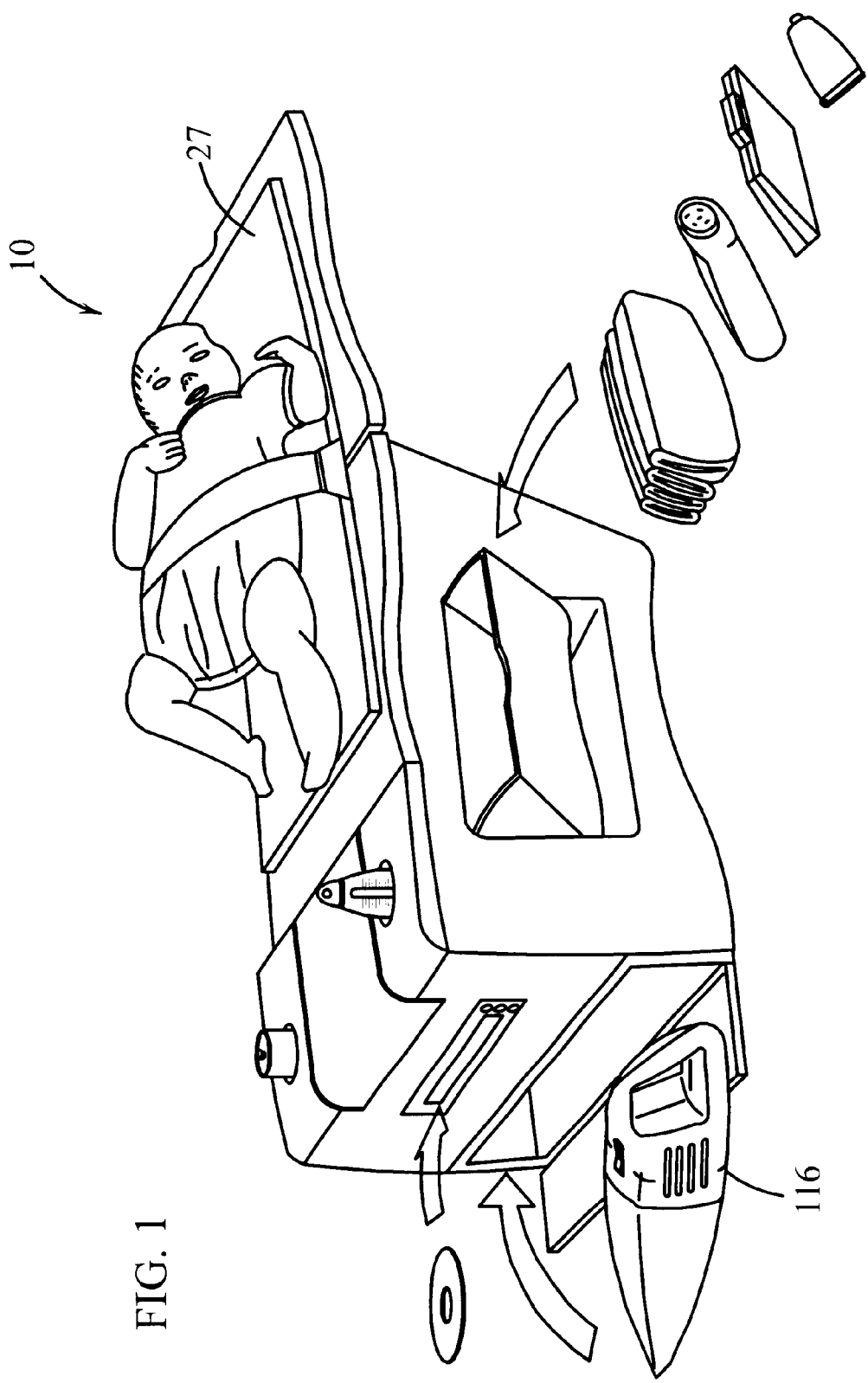
FIG. 1 is a perspective view of a multipurpose console constructed in accordance with the present invention.
Figure 2:
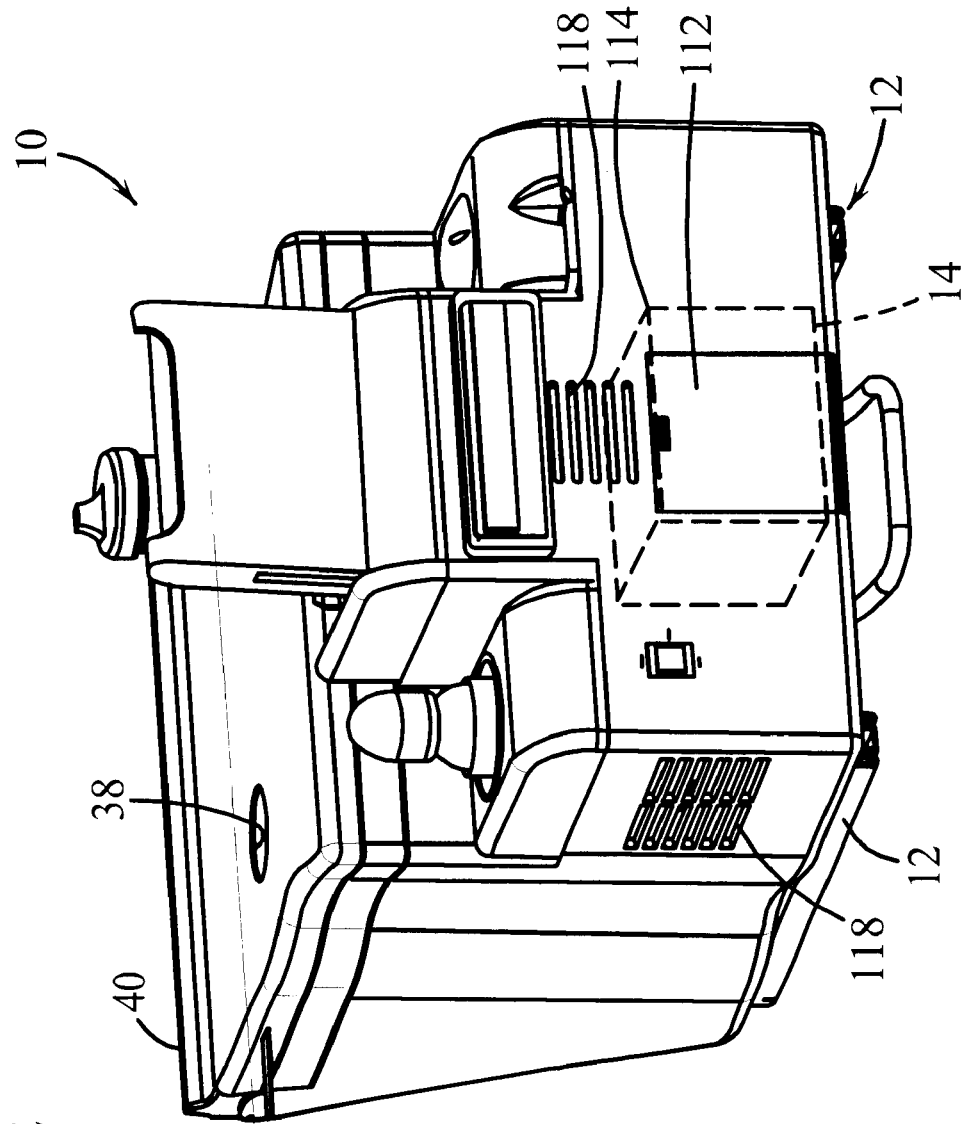
FIG. 2 is a perspective view of a multipurpose console constructed in accordance with an exemplary embodiment of the present invention.
Figure 3:
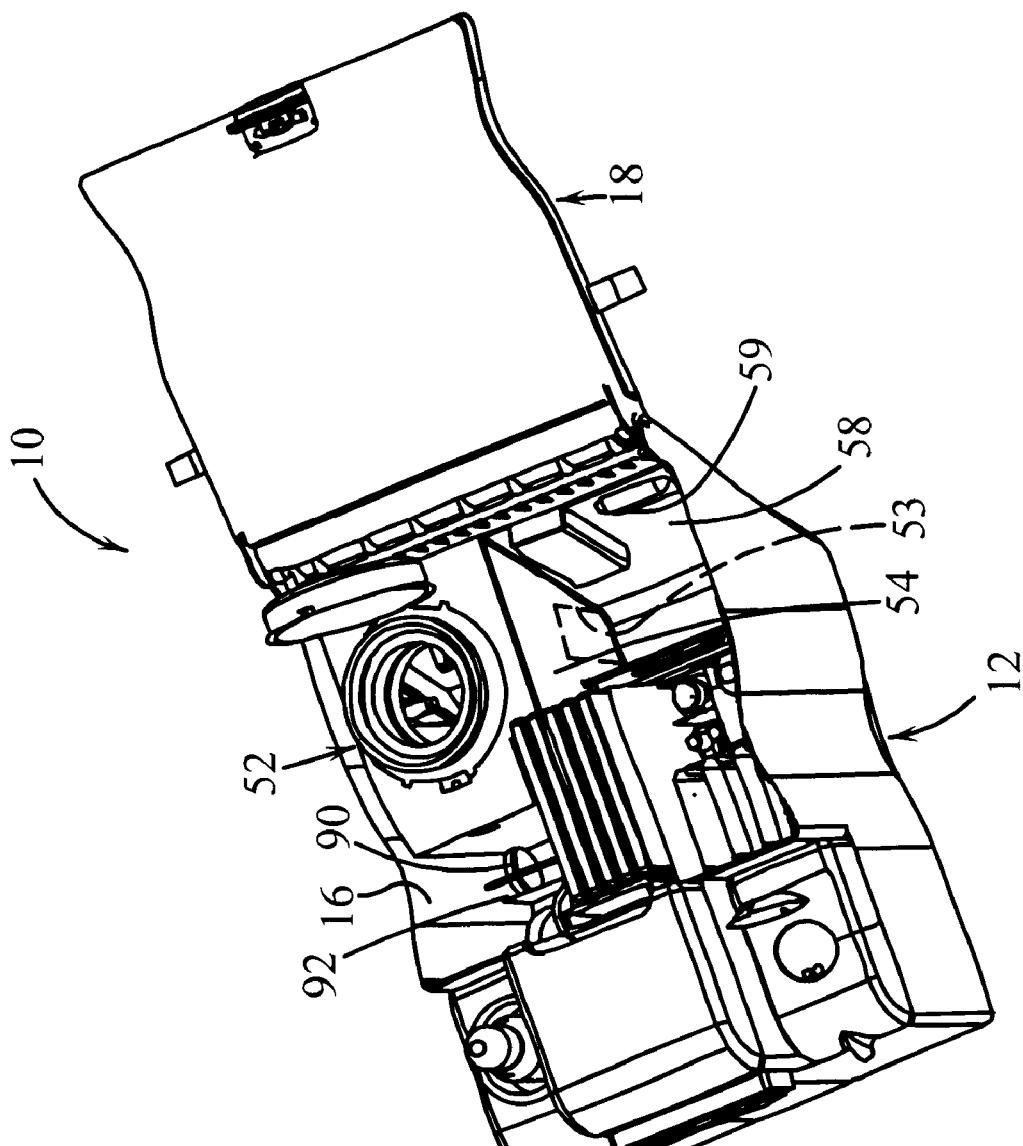
FIG. 3 is a perspective view illustrating features of a multipurpose console constructed in accordance with an exemplary embodiment of the present invention.
Figure 4:
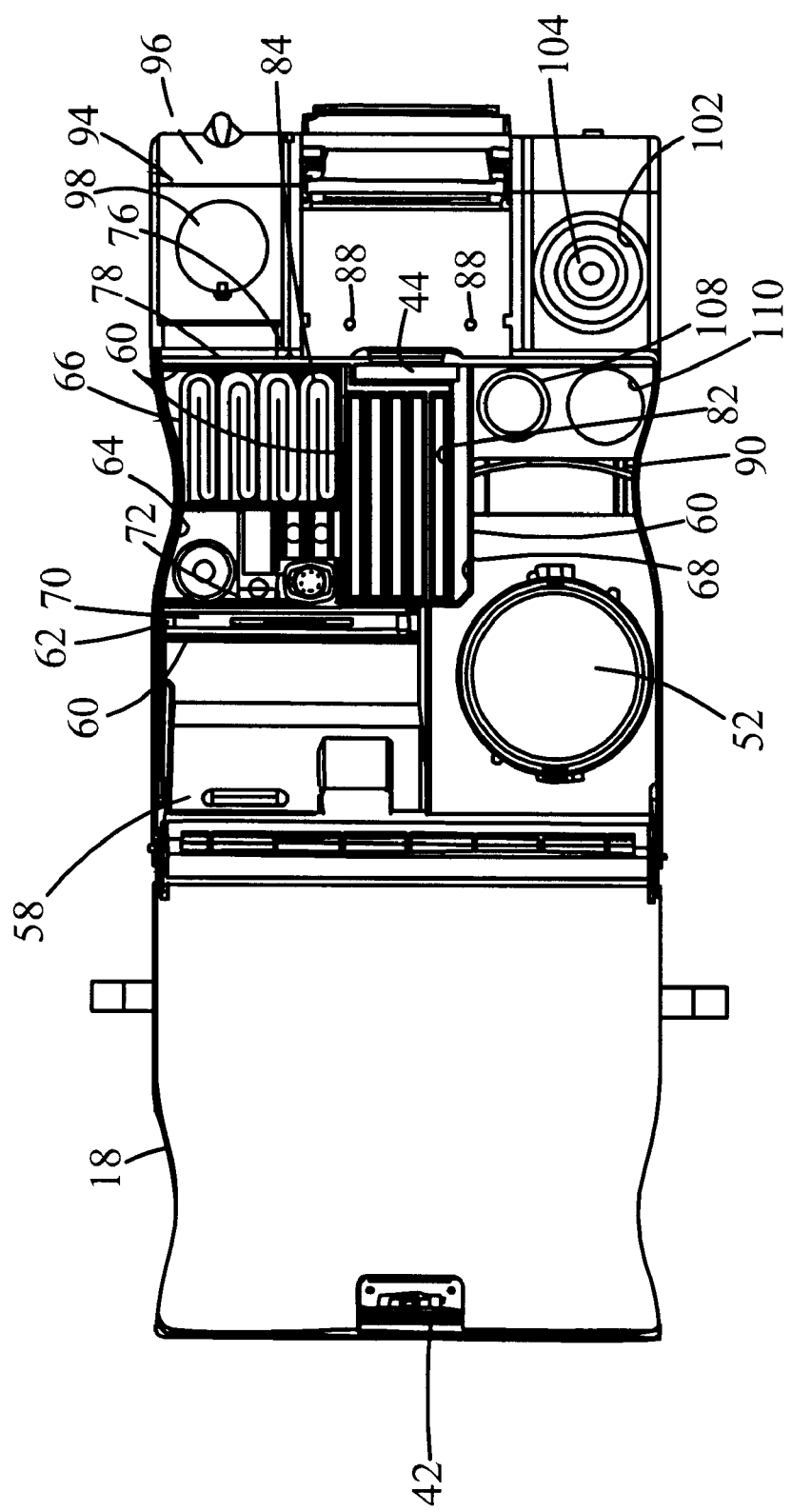
FIG. 4 is a top plan view illustrating features of a multipurpose console constructed in accordance with an exemplary embodiment of the present invention.
Figure 5:
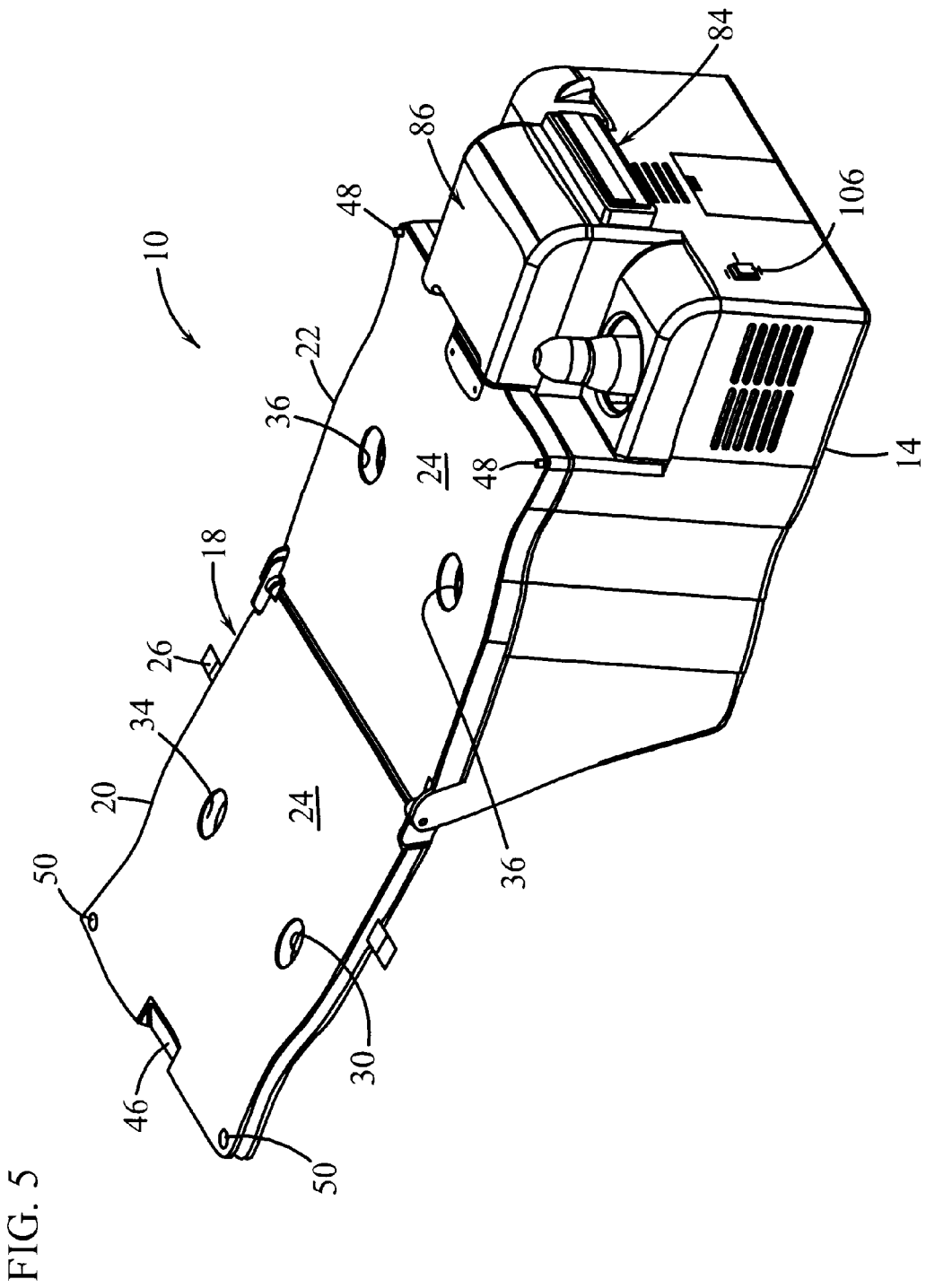
FIG. 5 is a perspective view illustrating features of a multipurpose console constructed in accordance with an exemplary embodiment of the present invention.
Figure 6:
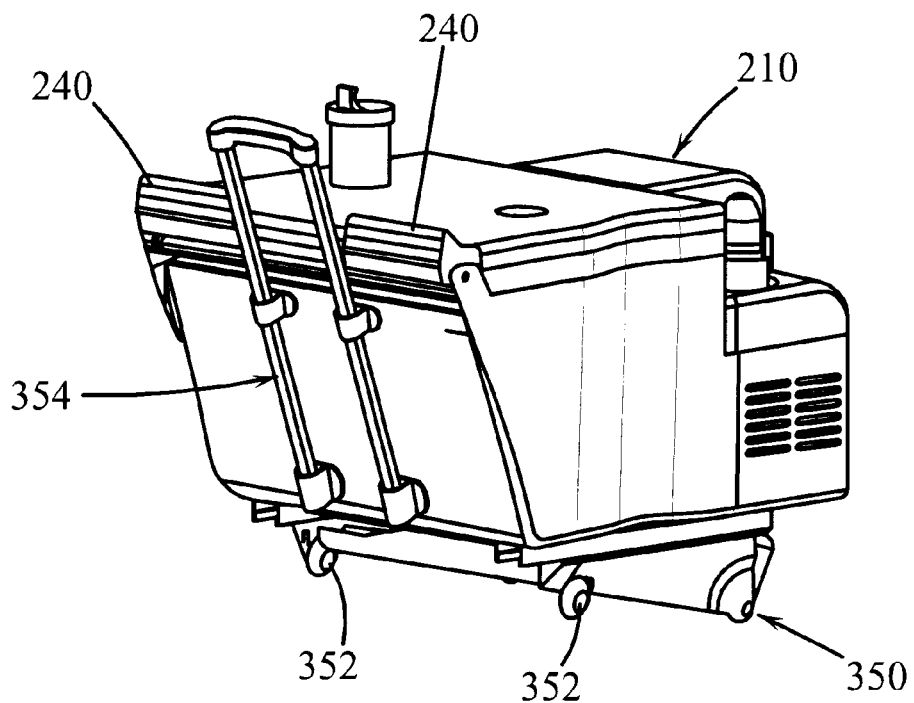
FIG. 6 is a perspective view of an alternative embodiment of the present invention.
Figure 7:
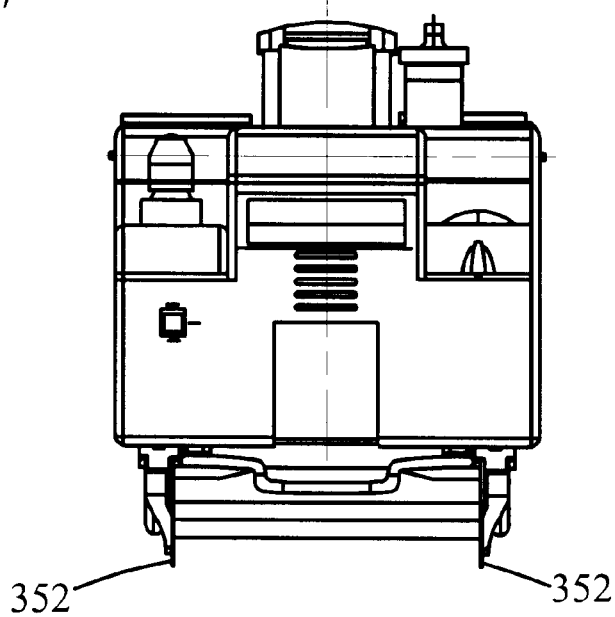
FIG. 7 is a front elevation of view of an alternative embodiment of the present invention.
Figure 8:
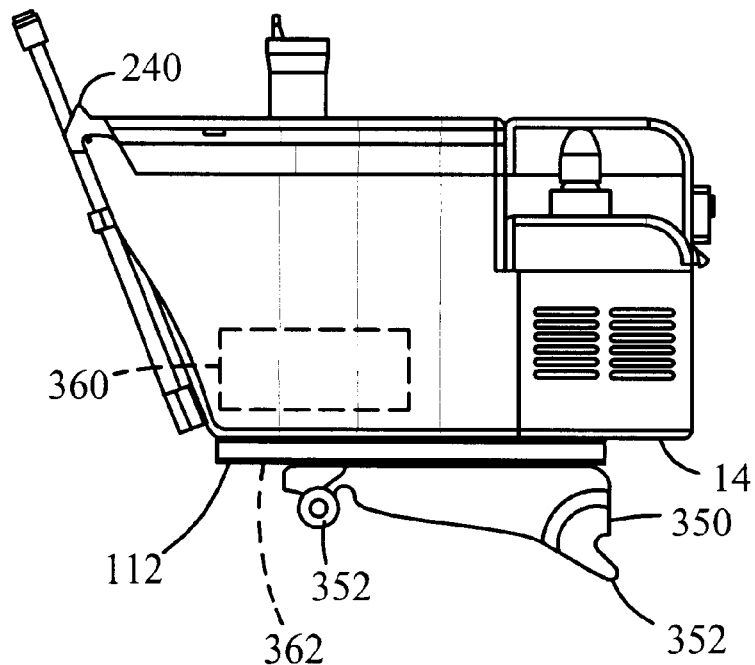
FIG. 8 is a side elevation of view of an alternative embodiment of the present invention.
Figure 9:
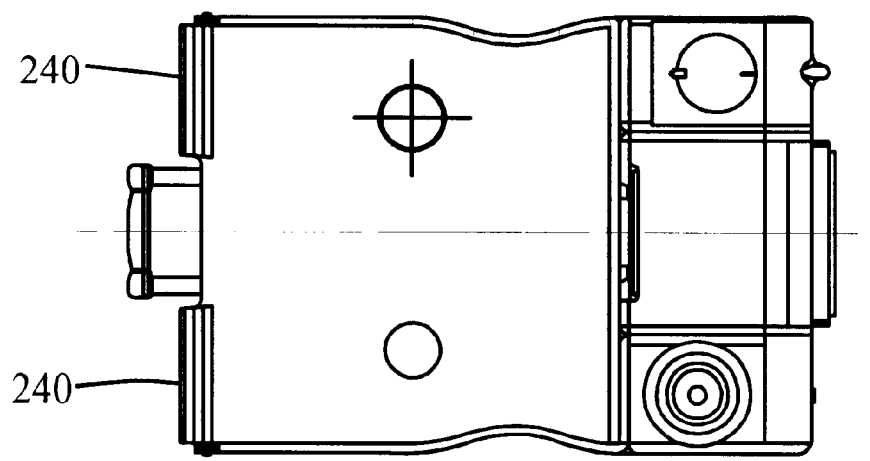
FIG. 9 is a top plan view of an alternative embodiment of the present invention.

Console 10 has a main interior compartment 16 that provides an area for housing a plurality of other features that will be discussed below. A lid 18 pivotally secured to console 10 for movement between an open position (FIG. 3 and 4) and a closed position (FIG. 2) provides access to interior compartment 16. Lid 18 has an upper portion 20 and a lower portion 22. Upper portion 20 is pivotally secured to lower portion 22 for movement between an open position (FIG. 5) and a closed position (FIGS. 2–4). The open position provides an expanded surface area 24 sufficiently large enough to be used as a diaper changing table (FIGS. 1 and 5).

A two-piece retractable safety strap 26 provides a means for securing an infant to the changing table. Each end of safety strap 26 has a complementary latching mechanism 28 for securing to each other, for example, a male/female latching mechanism or complementary surfaces such as hook and loop type connectors sold of the type sold under the VELCRO trademark. In addition, it is contemplated that either or both safety straps 26 are secured to a retracting mechanism that will retract each safety strap 26 into upper portion 20 when their use is no longer necessary.

Console 10 is provided with a soft cushioned changing pad 27 that is placed upon surface area 24 in order to provide cushioning for an infant. As an alternative, upper portion 20 and lower portion 22 may have a changing pad fixedly secured to the complementary surfaces that provide surface area 24.

Upper portion 20 of lid 18 has a pair of cup receiving apertures 30 which align with a cup holder portion 36 of lower portion 22 when upper and lower portions 20 and 22 are positioned on top of each other (FIGS. 1–5). In this position, a cup holder 38 is defined by apertures 30 and cup holder portion 36. In an exemplary embodiment, a pair of cup holders are positioned on the upper surface of upper lid portion 20. The cup holders are sized and configured to receive and retain a portion of a drinking container such as a children's cup. Of course, it is contemplated that the size, location, and number of cup holders 38 may vary.

As an alternative, cup holder 36 is equipped with additional cup holders that protrude into the receiving area defined by cup holder 36. This will prevent spillage of the contents of a cup placed within cup holder 38 by preventing the same from being jostled or dislodged by the movement of the vehicle into which console 10 is secured.

Upper lid portion 20 has a stop member 40 located proximate to the pivotal securement of upper lid portion 20 to lower lid portion 22. Stop member 40 provides an upper limit to the pivotal movement of upper lid portion 20 with respect to lower lid portion 22, namely, the open position illustrated in FIGS. 3 and 4. Lid 18 is provided with a lathing mechanism 42 for releasably engaging a latch 44. Upper lid portion 20 has a recessed handle portion 46 configured to allow an individual to grasp and pivot upper lid portion 20 with respect to lower lid portion 22. In addition, lower lid portion 22 has a pair of engagement tabs 48 for engaging a pair of complementary openings 50 in upper lid portion 20.

Referring now to FIGS. 3 and 4, interior compartment 16 houses a sanitary receiving receptacle 52. In an exemplary embodiment, receptacle 52 provides a sanitary means for receiving discarded items such as soiled diapers. Receptacle 52 includes a container 54 for disposing of and storing, e.g., soiled diapers. Container 54 includes a cover assembly 56 that releasably attaches to container 54. The fit between container 54 and cover assembly 56 is sufficiently close, so that with cover assembly 56 in place, container 54 is essentially airtight.

Container 54 is similar to a sanitary storage container disclosed in U.S. Pat. Nos. 5,813,200 and 6,128,890, the contents of which are incorporated herein by reference thereto.

Receptacle 52 is provided with an access door 53 in order to facilitate the removal of the soiled diapers. Access door 53 is positioned on a sidewall of receptacle 52 if receptacle 52 is fixedly secured within console 10. Alternatively, if receptacle 52 is removably secured within console 10 access door 53 can be on the lower surface or comprise the lower surface of receptacle 52. The removable securement of receptacle 52 within console 10 can be facilitated through the use of a snap in interference fit of a retaining mechanism. Alternatively, access door 53 will comprise the upper surface of receptacle 52. In this embodiment, receptacle 52 can be fixedly secured within console 10.

A removable storage bin 58 is configured to be removably received within a portion of receiving area 16. Removable storage bin 58 can be used as a storage bin or trash receptacle. Removable storage bin 58 has a handle or handle opening 59 that is configured to allow the fingers of an individual to grasp and pull out bin 58. As an alternative, a pair of handles 59 is positioned on opposite sides of bin 58.

A plurality of interior walls 60 define a plurality of storage receptacles 62, 64, 66 and 68. Storage receptacle 62 is configured and dimensioned to receive and retain a container 70. In an exemplary embodiment, container 70 is a case capable of storing a plurality of diaper wipes.

Storage receptacle 64 is further defined into a plurality of receiving areas 72 by a plurality of interior walls 74. Receiving areas 72 provide storage areas for useful items for caring for an infant. Such items include but are not limited to the following: powders, tissues, tissue box and complimentary holders, lotions, ointments, medicine and first-aid items.

Storage receptacle 66 is further defined into a plurality of receiving areas 76 by a plurality of interior walls 78. Each receiving area is configured to receive a plurality of diapers 80. Alternatively, storage receptacle 66 has a single receiving area for receiving a plurality of diapers 80.

Storage receptacle 68 is configured and dimensioned to receive a plurality of entertainment disks 82 and their associated covers. In an exemplary embodiment, entertainment disks 82 are DVD disks for use with a DVD player. In addition, other objects of similar dimensions may be stored in receptacle 68. Such items include, but are not limited to note pads, books, and adhesive note pads such as those sold under the POST IT trademark.

In addition, any of the aforementioned receptacles can be used to store children's toys, pacifiers and other items. Furthermore, each of these receptacles can be configured to be removeably stored within console 10. This feature will help facilitate in the cleaning and disinfecting of the same.

Referring now to FIGS. 1–5, console 10 is provided with a DVD player 84 having a flip top screen 86 that is pivotally mounted to console 10 for movement between a viewing position (FIG. 2) and a stowed position (FIGS. 3 and 5). In an exemplary embodiment, DVD player 84 and flip top screen 86 are similar to those used in the aviation industry to provide passengers (typically first-class passengers) with a selective viewing option on extended flights. Of course, it is contemplated that other entertainment systems such as VCRs, CD-players, and other magnetic media tape players and associated viewing screens can be used in lieu of DVD player 84 and flip top screen 86.

As flip top screen 86 is positioned into a viewing position, a pair of headphone jacks 88 is accessible for use with a pair of headphones 90. When the DVD player of console 10 is not in use, headphones 90 are stored within a headphone storage area 92 within interior compartment 16.

Figure 13:
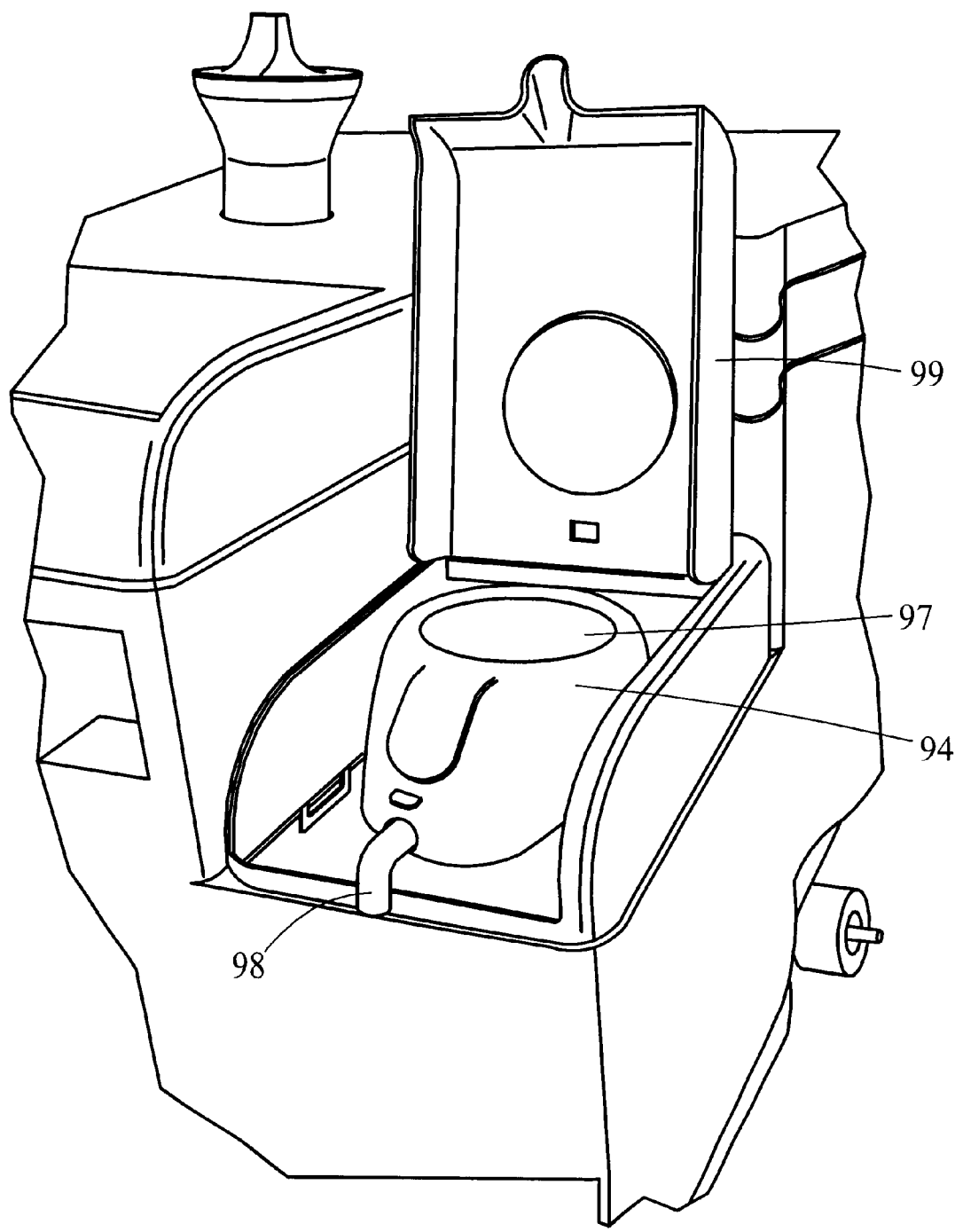
FIGS. 13–16 are views illustrating component parts and features of a multipurpose console constructed in accordance with an exemplary embodiment of the present invention.
Figure 14:
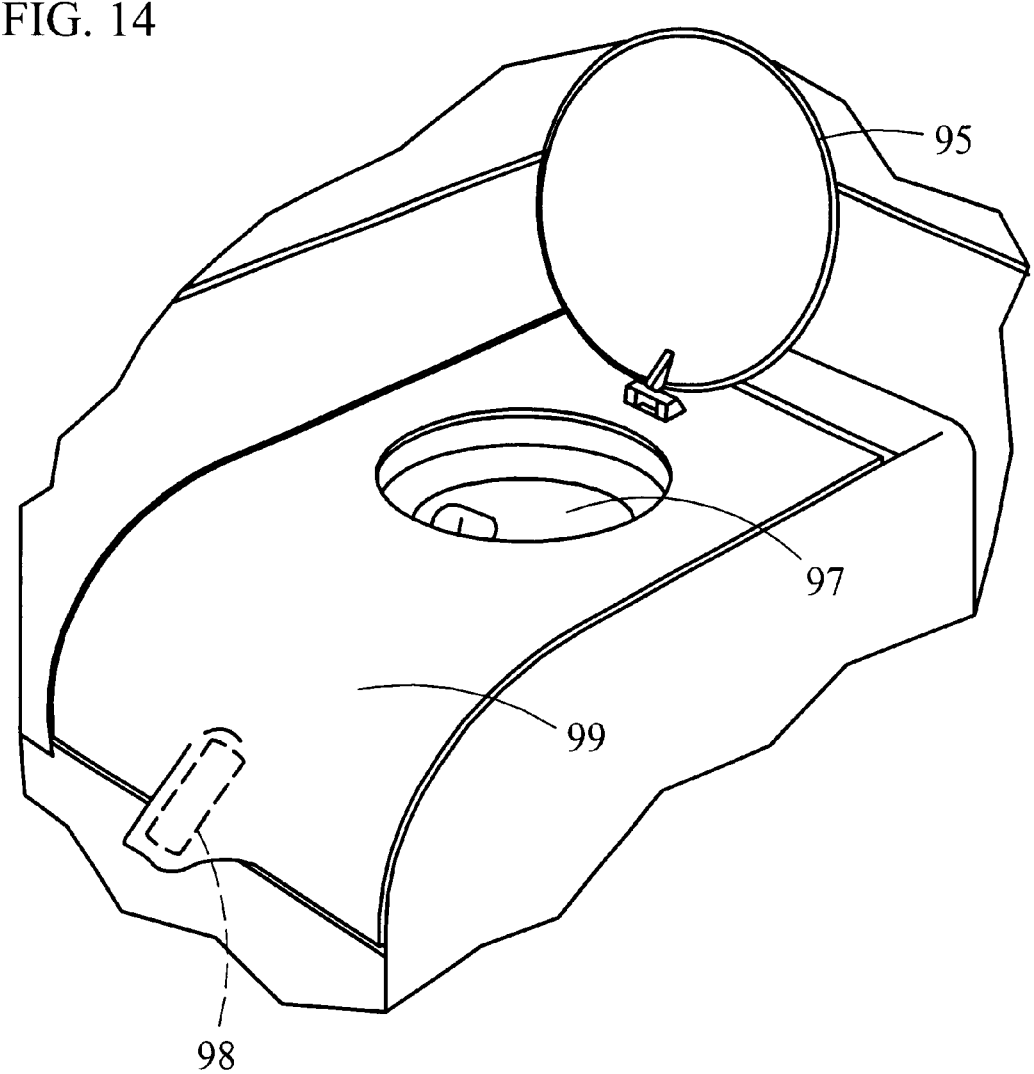
Figure 15:
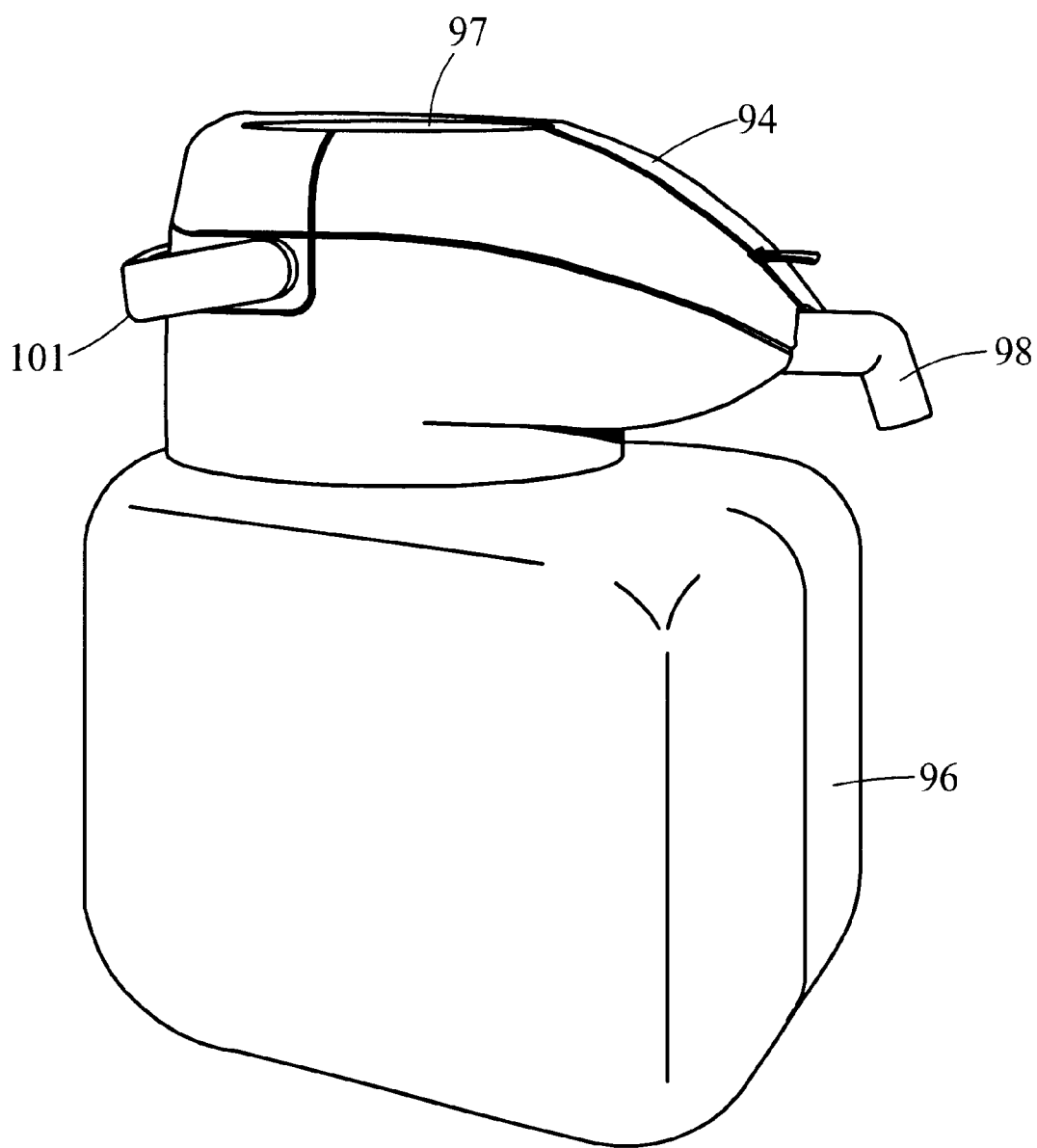

Console 10 is also provided with a water dispenser 94. (see also FIGS. 13–15) Water dispenser 94 has a reservoir 96 for storing a quantity of water or other liquid that is dispersible to a dispenser or spigot 98. As an alternative, reservoir 96 is removably secured within console 10 in order to facilitate the cleaning of the same. In order to disperse the liquids from water dispenser 94 an access lid 95 is pivoted into an open position (FIG. 14) and a force is applied to a plunger portion 97 causing the liquid to be dispersed from spigot 98.

In addition, console 10 is provided with an access door 99. Access door 99 is pivotally secured to console 10 in order to allow an individual to remove dispenser 94 and reservoir 96 from console 10 in order to facilitate the cleaning and filling etc. of the same. In addition, a handle 101 is secured to water dispenser 94. Handle 101 allows for convenient removal of water dispenser 94 from console 10.

Console 10 is also provided with a hot/cold cup holder/bottle warmer 100. Hot/cold cup holder 100 has a receiving area 102 for receiving a portion of a drinking vessel (soda can or baby bottle) which can be either heated or cooled by a thermoelectric device 104 or other device capable of providing a cooling or heating function. In an exemplary embodiment, thermoelectric device 104 is a thermal electric module capable of providing the thermodynamic output necessary to either heat or cool a vessel within cup holder 100.

Thermoelectric device 104 is activated by a selector switch 106 located on the surface of console 10. Selector switch 106 is positionable from an off position to either a heating or cooling position.

A bottle warming sleeve 108 is received and stored within a warming sleeve storage area 110 also positioned within receiving area 16.

Figure 16:
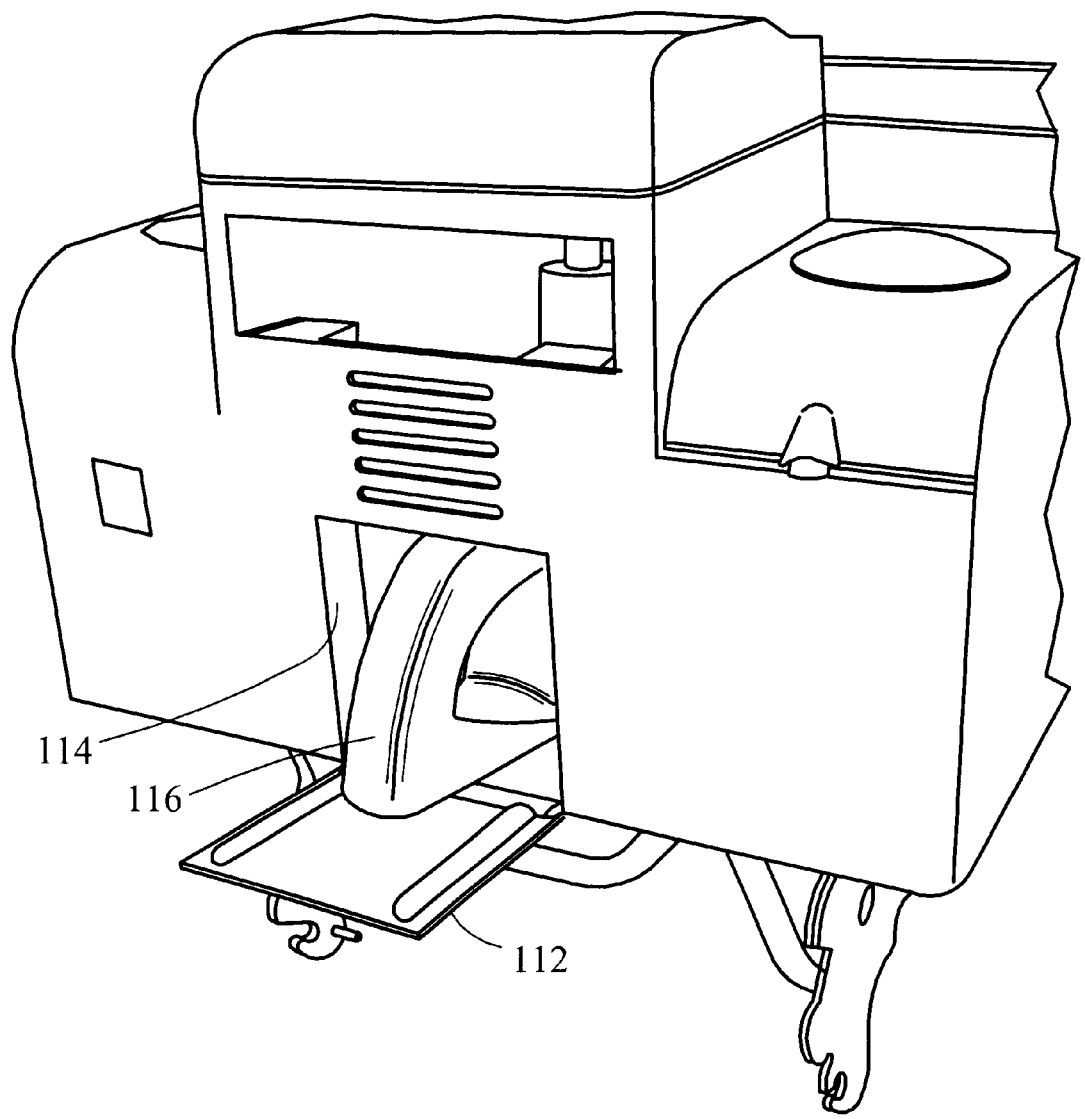

Console 10 has an access door 112 which allows a user to access an interior compartment 114. In an exemplary embodiment, interior compartment 114 is configured and dimensioned to house a portable vacuum cleaner 116. (See also FIG. 16) Vacuum cleaner 116 is a dry/wet vacuum capable of being battery operated and or operated from a cigarette adapter outlet.

Console 10 is also provided with a plurality of vent apertures 118. Vent apertures 118 allow heat generated by DVD player 84, DVD screen 86 and thermoelectric device 104 to escape from the inside of console 10 as well as allowing ambient or cool air to enter.

Referring now to FIGS. 6–9, an alternative embodiment of the present invention is illustrated where component parts performing similar or analogous functions are labeled in multiples of 100. Here, console 210 is provided with a portable chassis 350. Portable chassis 350 is releasably secured to a locking mechanism 112 in a similar manner as the locking engagement of mechanism 112 to the existing mounting features of a vehicle. Portable chassis 350 includes a plurality of rotatable wheels 352. In addition, a telescoping handle 354 is secured to a side wall of console 210. Accordingly, and as telescoping handle 354 is extended, an individual may grasp the handle and utilize console 210 in applications remote from the vehicle from which console 210 has been installed.

For example, console 210 may be used in temporary excursions away from the vehicle for daily activities and routine tasks such as shopping and/or visiting friends. Alternatively, console 210 may be used for more extended time periods away from the vehicle, such as overnight stays in hotels and/or camping trips.

In order to provide a source of power for the electrical components of console 210 in these applications, a battery supply 360 is incorporated into console 210. In an exemplary embodiment, battery supply 360 is a rechargeable source of power having a connector 362 which, in this case, is compatible to receive a recharging voltage from either a vehicle's electrical system or a standard wall outlet. Of course, necessary adapters and power converters are contemplated to be incorporated into connector 362 for recharging battery supply 360. It is also contemplated that console 210 can be equipped with a disposable power supply for either running the article apparatus of console 210 or maintaining a minimal amount of power.

The embodiment of FIGS. 6–9 also illustrates an alternate exemplary embodiment of a stop member 240. The stop member 240 is located proximate to the pivotal securement of upper lid portion to lower lid portion. Stop member 240 provides an upper limit to the pivotal movement of upper lid portion with respect to lower lid portion, namely, the open position.

Thus, console 10 provides a means for entertaining and caring for an infant while also being configured to be removably installed within a vehicle. In addition, console 10 provides other features such as storage areas, cup holders, and drink warmers/coolers. Moreover, console 10 is constructed to make use of an existing automotive design, thus, no costly modifications to the vehicle are required. Additionally, console 10 is portable and can provide a source of entertainment as well as caring for an infant and/or providing a storage receptacle for a plurality of items.

Figure 17:
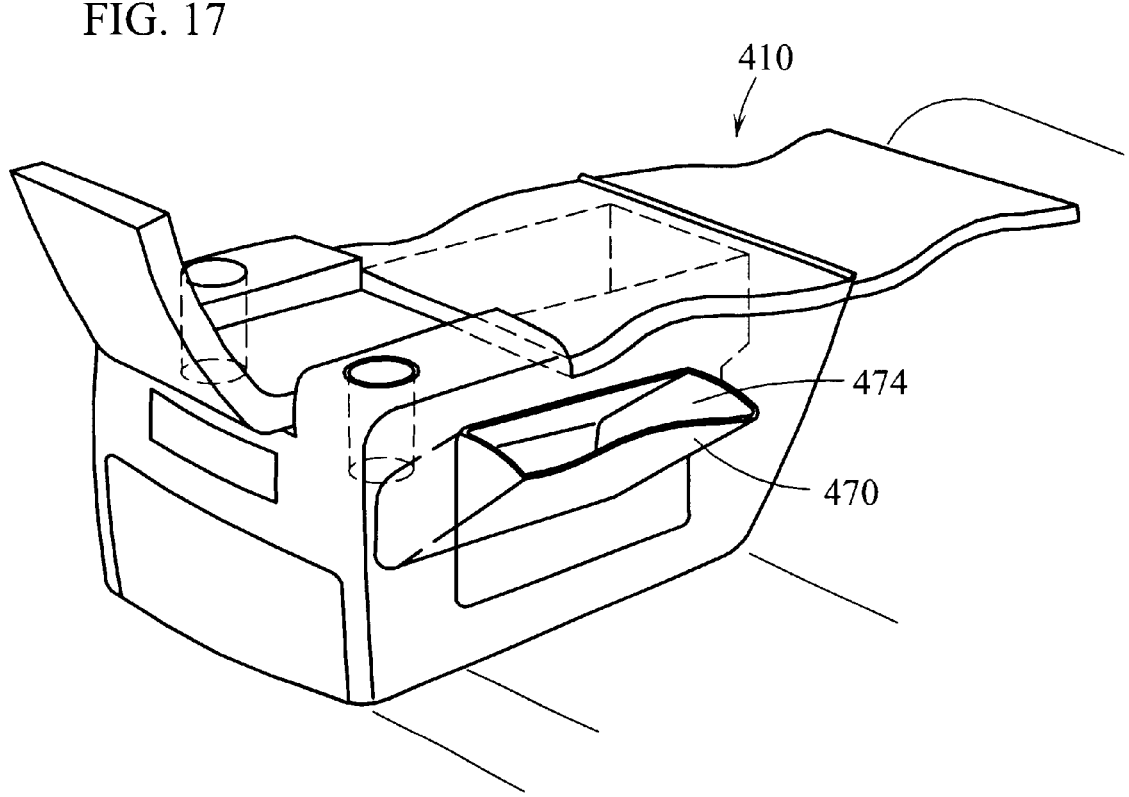
FIG. 17 is a perspective view of an alternative embodiment of the present invention.
Figure 18:
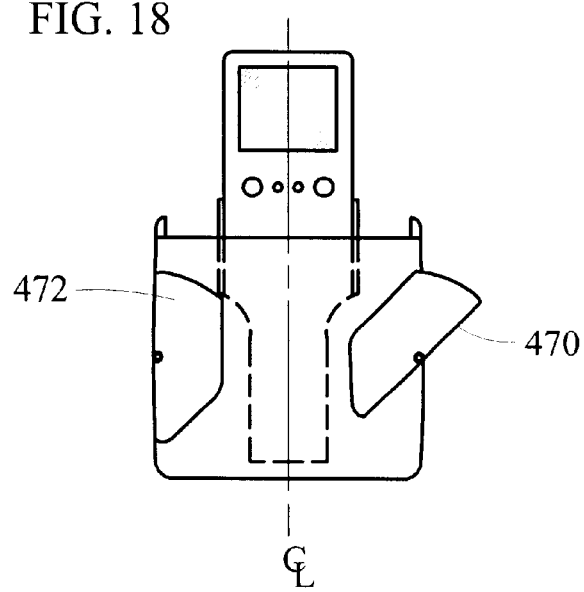
FIG. 18 is an end view of the FIG. 17 embodiment.
Figure 19:
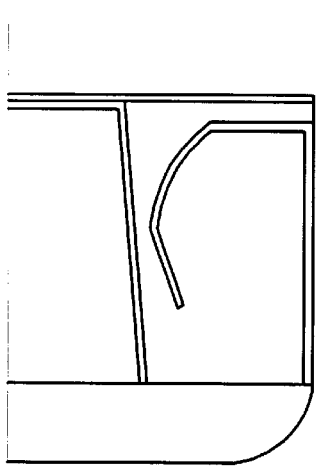
FIGS. 19–21 are orthographic views of another alternative embodiment of the present invention.
Figure 21:
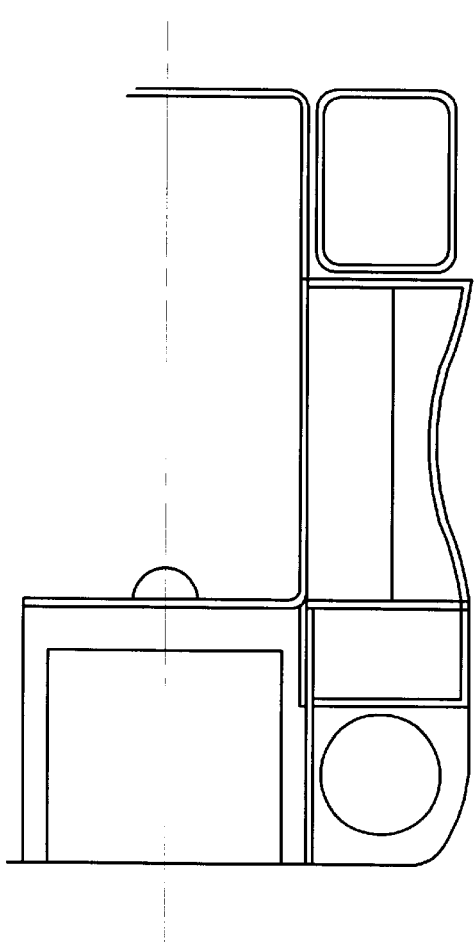
Figure 20:
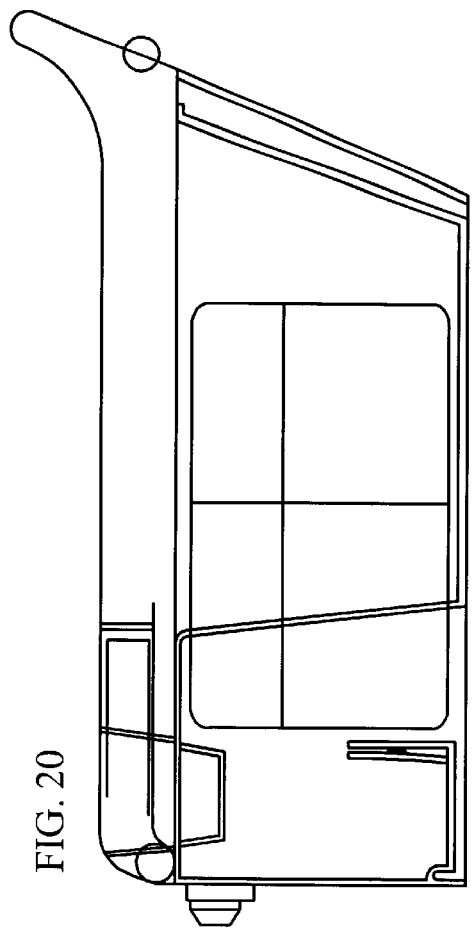

Referring now to FIGS. 17 and 18, another alternative embodiment is illustrated. Here multipurpose console 410 has a pair of side opening bins 470 which pivot outwardly from a side pocket 472. Side bins 470 are configured to provide a storage area 474 into which a plurality of items, may be stored.

Referring now to FIG. 22, an exploded view of yet another alternative embodiment is illustrated. Here a multipurpose console 510 is configured to receive and secure either an infant seat 555 or a toddler seat 557 to the upper surface of multipurpose console 510. Each seat (555 and 557) is equipped with a safety restraint for securing an occupant.

In this embodiment, a lid portion 518 is configured with a means for receiving and securing either infant seat 555 or toddler seat 557. The securing means of lid portion 518 is configured to receive and secure infant seat 555 in a rearward facing position while also being configured to receive and secure toddler seat 557 in a forward facing position.

For example, and as illustrated by the arrow in FIG. 22 toddler seat 557 is slid into the securing means of console 510 and once it is properly positioned toddler seat 557 is fixedly secured to multipurpose console 510. Similarly, infant seat 555 is slid into the securing means of console 510 as illustrated by the arrow in FIG. 22.

Figure 23:
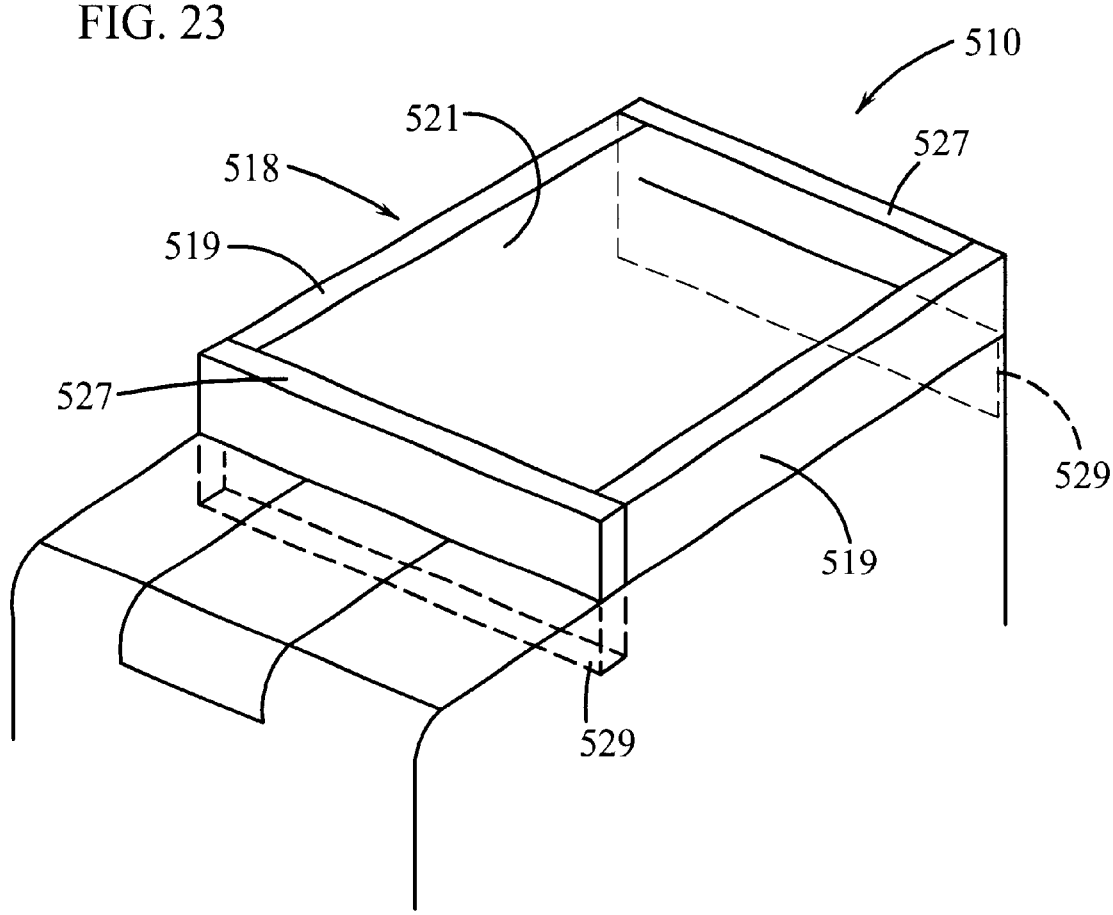
FIGS. 23–25 are perspective views of alternative securing means contemplated for use with the FIG. 22 embodiment.
Figure 24:
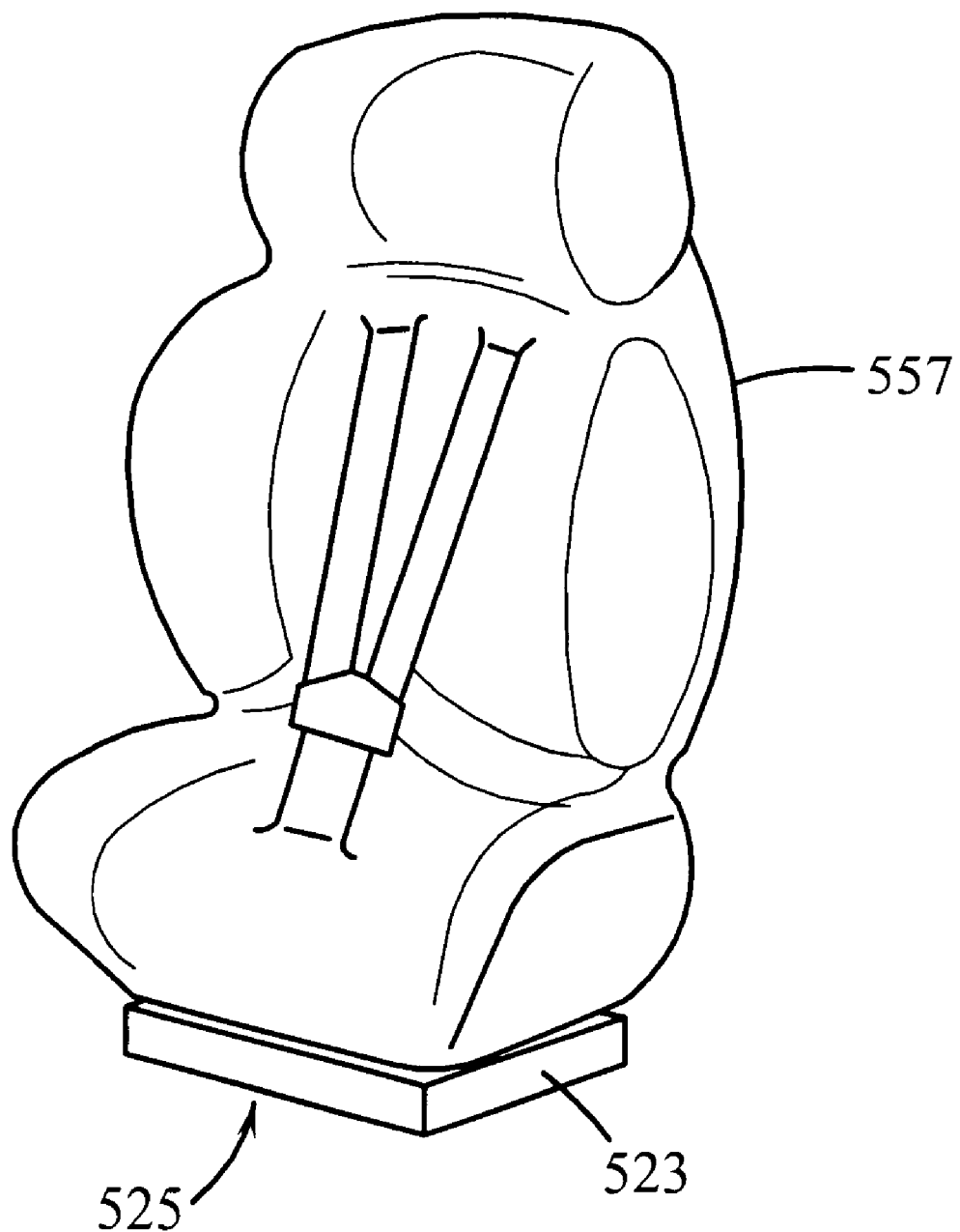

Referring now to FIG. 23, one of many contemplated securing means for lid 518 is illustrated. Here lid portion 518 is configured to have a pair of retaining members 519 each defining a securement channel 521. Channel 521 is configured to receive and engage a pair of complementary engagement members 523 of a securement portion 525 which is fixedly secured to the bottom of either toddler seat 557 or infant seat 555.

Engagement members 523 protrude outwardly from securement portion 525 and they are configured to be slidably engaged within channels 521 when either toddler seat 557 and or infant seat 555 is inserted into the securement means of lid portion 518, as illustrated by the arrows in FIG. 22.

In order to fixedly secure the seats to lid portion 518, the retaining means in one embodiment includes a pair of stop members 527 that are positioned at either end of the securement means of lid portion 518. In this embodiment, stop members 527 are configured to be depressed into a pair of receiving areas 529 in order to allow the insertion of the seats into the securement means. Once the seat is secured, stop members will be returned to their stopping position (e.g., at either end of the securement means).

In this embodiment, stop members 527 are spring biased in an upwardly direction so as to lock and secure the seat into the securement means after it has been fully inserted into channels 521.

Figure 25:
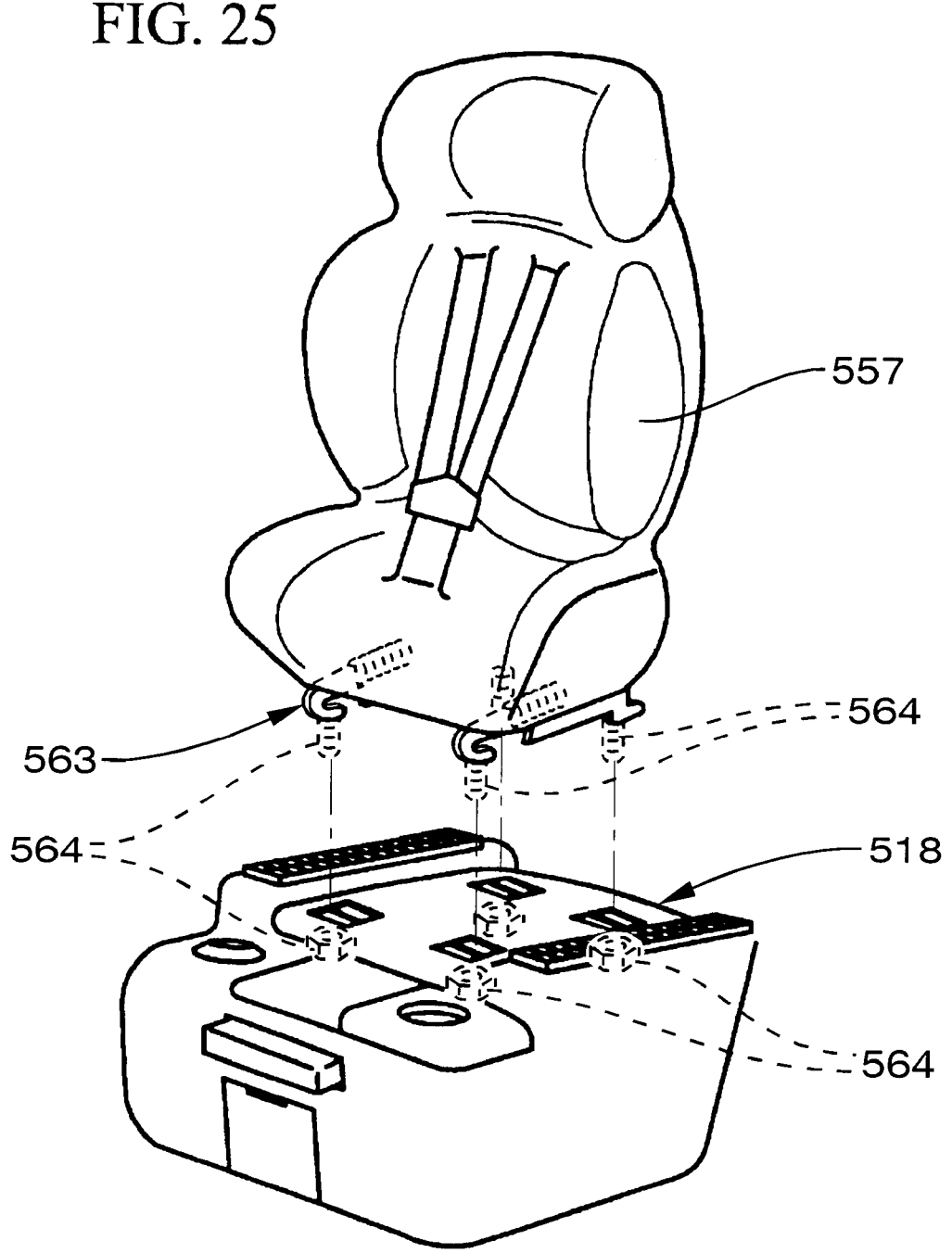

Alternatively, and referring now to FIG. 25 the lower portion of the seat has a latching mechanism similar to the latching mechanism illustrated in FIGS. 6–8 and 11–13, namely a hook and spring biased latching mechanism 563 configured to hook into a securing member at either the forward or rearward end and a complementary spring biased latching member at the opposite end. Lid portion 518 also has a plurality of latching members which receive and engage a portion of the latching mechanism. In this embodiment, the hook portion of the latching mechanism is inserted into one pair of the latching members while the spring-loaded latching portion is locked into the other pair. This configuration effectively secures the seat to the lid portion 518. Of course, other means for securing the seats to lid portion 518 are contemplated to be within the scope of this application. For example, a securement means such as a nut and bolt configuration 564 can be used to secure the seat to lid portion 518. The nut and bolt configuration may be used in applications where removal of the seat is less likely to occur.

In yet another alternative, the securing means is configured to secure to a universal feature positioned on the bottom of each car seat, thus allowing multipurpose console 510 to receive and secure many commercially available car seats.

Referring now to FIG. 22, the multipurpose console is secured to a vehicle by an adapter plate 512. Adapter plate 512 is a planar member configured to have a first securing means for interfacing and securing to vehicle seat attachments 513 which are located in a floor 515 of a vehicle. For example, the first securing means of adapter plate 512 can be configured to interface with and lock to the securing members utilized in vehicles having removable seats such as vans or minivans.

In addition, adapter plate 512 also has a second securing means for securing to the lower surface of multipurpose console 510. The second securing means includes but is not limited to the following: nut and bolt arrangements, spring-biased engagement members and screws.

Accordingly, the multipurpose console illustrated in FIG. 22 includes all of the amenities and/or features of the previous embodiments in addition to the capability of receiving and engaging either a car seat for infants and toddlers.

Figure 26:
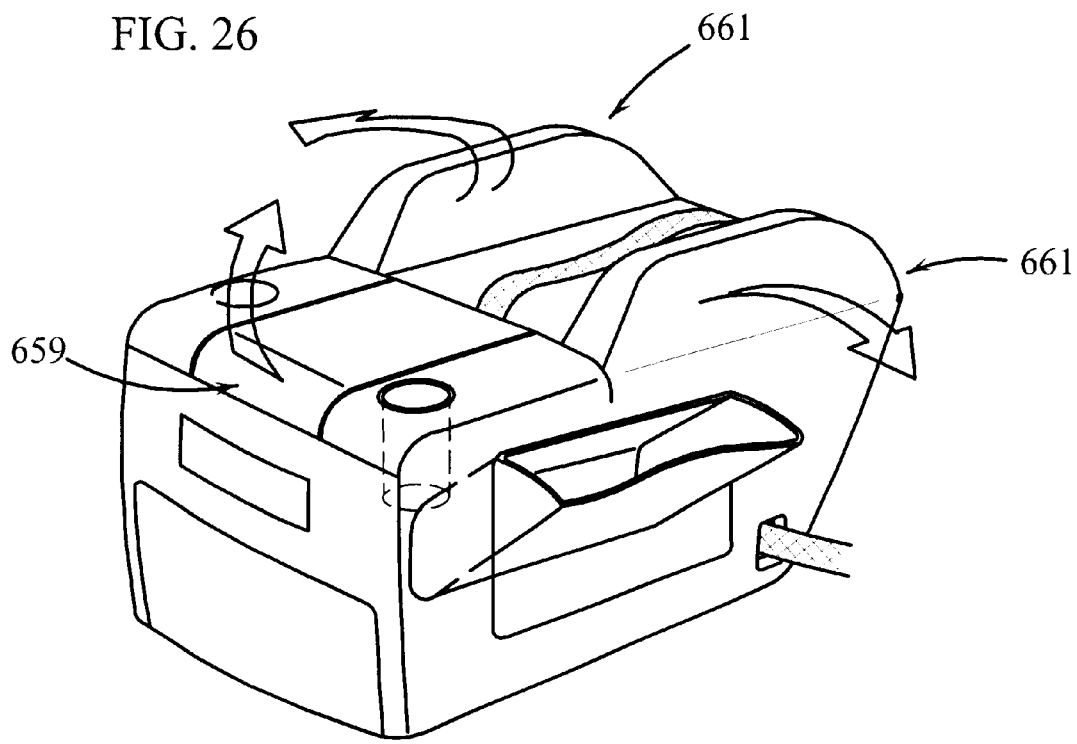
FIGS. 26 and 27 are perspective views of yet another alternative embodiment.
Figure 27:
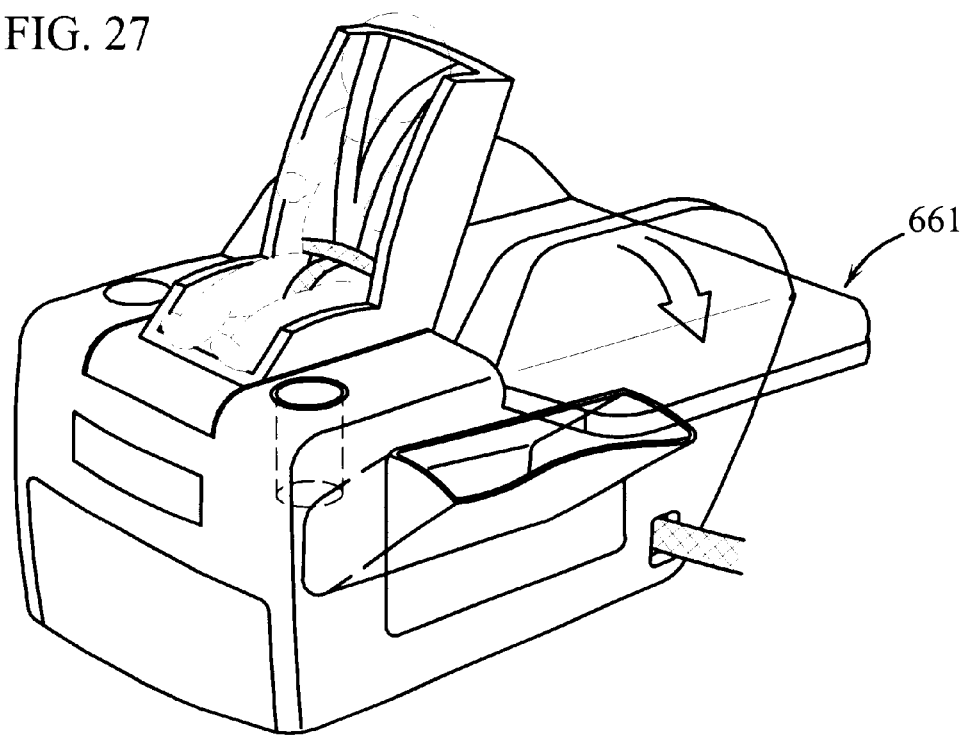

Referring now to FIGS. 26 and 27, yet another alternative embodiment of the childcare console is illustrated. Here, child care console 610 includes a folded child seat 659 integral with console 610. Here, child seat 659 is capable of being in stowed position (FIG. 26) and a deployed positioned (FIG. 27). Accordingly, the child seat is capable of being locked in a deployed positioned and a stowed position to create either a changing table or a child seat. Moreover, the child seat portion of the unit is rotatable with respect to console 610. Accordingly, the child seat portion rotates and adjusts so that it can be positioned to be rearwardly facing and used for infants. In addition, all of the amenities and/or features of the previous embodiments may be utilized in this embodiment. Additionally, each of these features is configured to be modular so that certain features can be replaced or supplemented by others. For example, the bottle warmer feature is modular with one of the cup holder features or alternatively the water dispenser. Another example is the DVD player is modular with and audiocassette player. Of course, the modular features are not limited to those described above.

Child care console 610 further includes side portions 661 that flip down to form a diaper changing station 624. A safety strap 626 provides a means for securing an infant to the changing station.

In accordance with an exemplary embodiment of the present invention, the child console/seat combination will connect directly to the vehicle via floor mounting bolts and/or minivans seat attachments. The safety seat/console combination will detach from the child care console or from the seat so it can be used to transport the child.

The child care console seat system is a totally integrated "seat system" in that the whole child care console system is not a child seat mounted onto a current seat but rather a complete seat system dedicated towards the entire child care required activities through adolescence (infant seat to boost seat) to use the seat system, the vehicle owners and/or operator would remove and replace the current seat with the child care console seat system. The base or console is designed to contain all of the required or normal products necessary for the care of the growing child. This base/console can be detached from the vehicle floor for cleaning purposes or use in another vehicle.

The child seat is attached to the upper portion of the base/console with hard mounting devices, such that it may be removed completely used as a portable child caring device, or placed in a stroller. The child seat may be attached to the base/console so that it can face forward or be attached with the child facing rearward.

As a child grows, the child seat is expandable to accommodate children up to 60/70 pounds. The seat has a recliner similar to a regular vehicle seat which allows the seat to be declined as needed more reclined to a 180 degree position in order to allow the child to be changed from a soiled diaper or to simply changed its clothes.

The hard mounting devices are intended to secure the seat to the console base without a safety seat belt harness system as is required today. The seat uses exclusive universal mounting brackets, which allow for quick an easy attachment and quick and easy release from its console base. The seat uses a four point attachment system.

The seat also has expandable side wings for both the thighs and torso of the child. The side wings are adjustable to allow the seat to grow and expand as the child grows. The seat also has an adjustable headrest support and an adjustable headrest support wings. The seat also contains adjustable footrest. Thus, the system is capable of expanding as the child grows.

The seat has the required safety harness as required by law and as the child grows; the safety harness can be exchanged/replaced with a larger sized safety seat belt system to accommodate the growing child.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multipurpose console for use in a vehicle, comprising:

a) a support structure having an upper portion and a lower surface and defining an internal compartment;

b) a latching mechanism being fixedly secured to said lower surface of said support structure, and being configured and dimensioned to releasably engage a mounting member of the vehicle;

c) a child seat being removably secured to said upper portion, wherein said multipurpose console provides a surface area large enough to provide an area for changing a child's diaper; and d) a retractable safety strap secured to said multipurpose console, said retractable safety strap having a first strap portion being fixedly secured to said multipurpose console at one end and a first connector portion at the other, said first connector portion being configured and dimensioned to engage a second connector portion secured to one end of a second strap portion having its other end secured to said multipurpose console.

2. A multipurpose console as in claim 1, further comprising:

e) an electronic entertainment device.

3. A multipurpose console as in claim 2, wherein said electronic entertainment device is a DVD player and DVD screen, said DVD screen being pivotally mounted to said multipurpose console for movement between a deployed position and a closed position.

4. A multipurpose console as in claim 1, wherein said internal compartment includes a plurality of storage compartments, one of said plurality of storage compartments being configured and dimensioned to receive and store a plurality of diapers.

5. A multipurpose console as in claim 4, wherein one of said plurality of storage compartments is a removable container.

6. A multipurpose console as in claim 4, wherein one of said plurality of storage compartments is configured to receive and store a plurality of DVD disks.

7. A multipurpose console as in claim 1, further comprising:

e) a pair of cup holders being configured, dimensioned and positioned to receive and engage a portion of a cup.

8. A multipurpose console as in claim 1, further comprising:

e) a portable vacuum, said portable vacuum being stored within a storage area accessible through an access door positioned on an exterior surface of said support structure.

9. A multipurpose console as in claim 1, further comprising:

e) an electronic device for heating or cooling an interior surface of a receptacle positioned on said upper surface of said support structure.

10. A multipurpose console as in claim 1, further comprising:

e) a reservoir having a spigot for dispersing the contents of said reservoir.

11. A multipurpose console as in claim 1, further comprising:

e) a mobile assembly being configured and dimensioned for securement to said latching mechanism, said mobile assembly having a plurality of wheels being configured and dimensioned to make contact with a surface when said mobile assembly is secured to said latching mechanism.

12. A multipurpose console as in claim 12, further comprising:

f) a telescoping handle secured to an outer surface of said support structure.

13. A childcare console for use in a vehicle having a mounting member and a forward end and a rearward end, comprising:
- a base portion having an upper surface, a lower surface, and an internal compartment defined therein;
- a latching mechanism being secured to said lower surface, said latching mechanism being configured to releasably engage the mounting member of the vehicle; and
- an apparatus for securing either an infant seat or a toddler seat in a rearward facing position or a forward facing position to said upper surface, said rearward facing position and said forward facing position being defined with respect to the forward end or the rearward end of the vehicle.

14. The childcare console as in claim 13, further comprising:
- a lid pivotally secured to the console and comprising said upper surface for movement between a first position and a second position, said lid being configured to cover said internal compartment when said lid is in said first position, and said lid defining a diaper changing area when in said second position.

15. The childcare console as in claim 13, wherein said apparatus comprises:
- a pair of retaining members each defining a securement channel on said upper surface;
- a pair of engagement members fixedly secured to each of said infant seat and said toddler seat, said engagement members being configured to slideably engage said securement channels; and
- a pair of stop members positioned on said upper surface at ends of said securement channels, said stop members having a first position and a second position, said first position allowing said engagement members to be slideably engaged with said securement channels, and said second position preventing said engagement members from being removed from said securement channels.

16. The childcare console as in claim 15, wherein said stop members are biased to said first position.

17. The childcare console as in claim 15, wherein said stop members in said second position are depressed into a receiving area of said upper surface, and in said first position extend above said receiving area.

18. The childcare console as in claim 13, wherein said apparatus comprises:
- a pair of hook portions defined on a bottom of each of said infant seat and said toddler seat;
- a pair of spring biased latching members defined on said bottom of each of said infant seat and said toddler seat; and
- a plurality of latching members defined on said upper surface, said plurality of latching members being configured and positioned to receive and engage said hook portions and said spring biased latching members or
- a nut and bolt connection securing said infant seat or said toddler seat to said upper surface.

19. The childcare console as in claim 13, wherein said latching mechanism comprises:
- an adapter plate defining a first surface and a second surface;
- a first securing member on said first surface, said first securing member releasably engaging said lower surface; and
- a second securing member on said second surface, said second securing member being configured to releasably engage said mounting member of the vehicle.

20. The childcare console as in claim 13, wherein said base portion further includes one or more of an electronic entertainment device, a bottle warmer for heating a baby bottle, a reservoir having a spigot for dispersing contents of said reservoir, a thermal electric device for heating or cooling a beverage container, and a portable vacuum being stored within a storage area accessible through an access door positioned on an exterior surface of said base portion.

21. The childcare console as in claim 13, wherein said latching mechanism is configured to releasably secure a portable chassis to said base portion, said portable chassis including plurality of rotatable wheels being configured and dimensioned to make contact with a surface when said portable chassis is secured to said latching mechanism.

22. The childcare console as in claim 21, wherein said base portion further comprises a telescoping handle secured to a side surface of said base portion.

23. A childcare console for use in a vehicle, comprising:
- a base portion having an upper surface, a lower surface, and an internal compartment defined therein;
- a latching mechanism being secured to said lower surface, said latching mechanism being configured to releasably engage a mounting member of the vehicle; and
- a child seat movably mounted to said base portion for movement among a first position, a second position, and a third position, said child seat being stowed within said base portion when in said first position, said child seat defining a forward facing seat with respect to a direction of travel of the vehicle when in said second position, and said child seat defining a rearward facing seat with respect to said direction of travel of the vehicle when in said third position, wherein said child seat is pivotally mounted to said base portion such that said child seat can be pivoted between said first and second positions.

24. The childcare console as in claim 23, wherein said child seat is rotatably mounted to said base portion such that said child seat can be rotated between said second and third positions.

25. The childcare console as in claim 23, wherein said upper surface further comprises a diaper changing table.

26. The childcare console as in claim 23, wherein said internal compartment has a plurality of modular subcompartments being configured for receipt of child-care products.

27. The childcare console as in claim 23, wherein said base portion further includes one or more of an electronic entertainment device, a bottle warmer for heating a baby bottle, a reservoir having a spigot for dispersing contents of said reservoir, a thermal electric device for heating or cooling a beverage container, and a portable vacuum being stored within a storage area accessible through an access door positioned on an exterior surface of said base portion.

28. A childcare console for use in a vehicle, comprising:
- a base portion having an upper surface, a lower surface, and an internal compartment defined therein;
- a latching mechanism being secured to said lower surface, said latching mechanism being configured to releasably engage a mounting member of the vehicle; and
- a child seat movably mounted to said base portion for movement among a first position, a second position, and a third position, said child seat being stowed within said base portion when in said first position, said child seat defining a forward facing seat with respect to a direction of travel of the vehicle when in said second position, and said child seat defining a rearward facing seat with respect to said direction of travel of the vehicle when in said third position;

wherein said upper surface further comprises a diaper changing table, said diaper changing table comprises a pair of foldable side portions.

29. A childcare console for use in a vehicle, comprising:

a base portion having an upper surface, a lower surface, and an internal compartment defined therein;

a latching mechanism being secured to said lower surface, said latching mechanism being configured to releasably engage a mounting member of the vehicle; and a child seat movably mounted to said base portion for movement among a first position, a second position, and a third position, said child seat being stowed within said base portion when in said first position, said child seat defining a forward facing seat with respect to a direction of travel of the vehicle when in said second position, and said child seat defining a rearward facing seat with respect to said direction of travel of the vehicle when in said third position, wherein said latching mechanism is configured to releasably secure a portable chassis to said base portion, said portable chassis including plurality of rotatable wheels being configured and dimensioned to make contact with a surface when said portable chassis is secured to said latching mechanism.

30. The childcare console as in claim 29, wherein said base portion further comprises a telescoping handle secured to a side surface of said base portion.

* * * * *